US012687947B2

(12) United States Patent
Jeon et al.

(10) Patent No.: US 12,687,947 B2
(45) Date of Patent: Jul. 21, 2026

(54) DISPLAY DEVICE

(71) Applicant: LG Display Co., Ltd., Seoul (KR)

(72) Inventors: JuWon Jeon, Paju-si (KR); DongKyu Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/805,372

(22) Filed: Aug. 14, 2024

(65) Prior Publication Data

US 2025/0231636 A1 Jul. 17, 2025

(30) Foreign Application Priority Data

Jan. 16, 2024 (KR) ......................... 10-2024-0006574

(51) Int. Cl.
*G06F 3/041* (2006.01)
*G06F 3/044* (2006.01)
(52) U.S. Cl.
CPC .................... *G06F 3/04164* (2019.05); *G06F 2203/04107* (2013.01)

(58) Field of Classification Search
None
See application file for complete search history.

(56) References Cited

U.S. PATENT DOCUMENTS

| 2005/0083472 A1* | 4/2005 | Nakanishi | ........... G02F 1/13458 |
| | | | 349/149 |
| 2013/0293508 A1* | 11/2013 | Lin | ........................ G06F 3/0443 |
| | | | 345/173 |
| 2017/0262109 A1* | 9/2017 | Choi | ..................... H10D 86/411 |
| 2020/0152707 A1* | 5/2020 | Won | ................... H10K 59/8731 |
| 2020/0388667 A1* | 12/2020 | Rhe | ........................ H10K 59/40 |

* cited by examiner

*Primary Examiner* — Krishna P Neupane
(74) *Attorney, Agent, or Firm* — Birch, Stewart, Kolasch & Birch, LLP

(57) ABSTRACT

A display device in one example includes a substrate having a display area configured to display an image and a non-display area located outside of the display area and including a bending area and a pad area. The display device further includes a touch sensor layer disposed on the substrate, and a protective link line including the same metal as the touch sensor layer. The protective link line is disposed in the non-display area and runs through the bending area.

19 Claims, 20 Drawing Sheets

A

B

1700

353
600
351/352
333
332
613
331
612
323
322
321
313
312
311
303
302 }111
301

1900

DISPLAY DEVICE

CROSS-REFERENCE TO RELATED APPLICATION

This application claims priority to Republic of Korea Patent Application No. 10-2024-0006574, filed on Jan. 16, 2024 in the Korean Intellectual Property Office, the entire contents of which is hereby expressly incorporated by reference into the present application.

BACKGROUND

Field

The present disclosure relates to electronic devices, and more specifically, to display devices capable of addressing bending cracks of signal lines.

Discussion of the Related Art

A substrate included in a display device can include a display area allowing an image to be displayed and a non-display area where an image is not displayed. The non-display area of the substrate can have a portion to which a driving chip or a printed circuit board is connected, and this portion can be bent and located on the bottom of, or under, the substrate.

Signal lines disposed on the substrate can run through a bending area and can be connected to the driving chip or the printed circuit board. As the signal lines are bent together with the substrate, cracks can occur due to bending.

The cracks of such signal lines due to bending (hereinafter, which can be referred to as bending cracks) can cause defects in signal transferring, which in turn can make the normal operation of the display device difficult. Thus, the cracks of the signal lines due to bending can cause such severe problems, but the bending cracks of the signal lines may not be detected depending on a crack detection method applied during the process of manufacturing a display device.

Further, even if the bending cracks of the signal lines are detected, when the bending cracks of the signal lines are detected at a stage where the bending cracks of the signal lines cannot be cured by performing a corresponding process again, there can occur a situation where an associated display panel has no choice but to be discarded. In another situation, the bending cracks of the signal lines can occur after manufacturing of the display device is completed, which can negatively affect the operation of the display device.

SUMMARY OF THE DISCLOSURE

To address these issues associated with the related art, one or more aspects of the present disclosure can provide a display device having signal transfer structures capable of coping with bending cracks of signal lines.

One or more aspects of the present disclosure can provide a display device having signal transfer structures configured to enable signal transferring to be normally or properly performed even when a bending crack may occur in a signal line that is bent along with a substrate.

According to one or more example embodiments of the present disclosure, a display device can include a substrate including a display area for displaying an image and a non-display area located outside of the display area and including a bending area and a pad area, a touch sensor layer disposed on the substrate, a signal line connected to a pad disposed in the pad area, including a metal different from the touch sensor layer, and delivering a display driving-related signal, and a protective link line electrically connected to the signal line and running through the bending area.

According to one or more aspect of the present disclosure, the protective link line can include the same metal as the touch sensor layer. At least a portion of the protective link line can extend in the bending area in a lengthwise direction of the bending area.

According to one or more aspect of the present disclosure, the touch sensor layer can include at least one sensor metal and at least one bridge metal. A sensor interlayer insulating layer can be disposed between the sensor metal and the bridge metal, and a sensor protective layer can be disposed on the sensor metal and the bridge metal.

According to one or more aspect of the present disclosure, the sensor protective layer can extend from the display area to the non-display area and be configured to cover the protective link line.

According to one or more example embodiments of the present disclosure, a display device can include a substrate including a display area for displaying an image, and a non-display area located outside of the display area and including a bending area and a pad area, a signal line connected to a pad disposed in the pad area, and a protective link line disposed in the non-display area and connected in parallel with the signal line.

According to one or more aspect of the present disclosure, at least a portion of the protective link line can extend in the bending area in a lengthwise direction of the bending area.

In one or more aspects of the present disclosure, the display device can further include at least one transistor on a substrate, at least one light emitting element on the at least one transistor, an encapsulation layer on the at least one light emitting element, and a touch sensor layer disposed on the encapsulation layer.

According to one or more aspect of the present disclosure, the protective link line can include the same metal as the touch sensor layer.

According to one or more example embodiments of the present disclosure, a display device can include substrate including a bending area, at least one signal line running through the bending area, and a protective link line connected in parallel with the signal line.

According to one or more aspects of the present disclosure, a display device can have signal transfer structures capable of coping with bending cracks of signal lines.

According to one or more aspects of the present disclosure, a display device can have signal transfer structures configured to enable signal transferring to be normally performed even when a bending crack occurs in a signal line that is bent along with a substrate.

A display device according to one or more aspects of the present disclosure can provide advantages of not only preventing a situation in which a display panel has to be discarded due to failure to cope with bending cracks of signal lines, but also reducing burden on a process of detecting the bending cracks, and thereby, enabling process optimization to be realized.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION OF THE EMBODIMENTS

Figure 1:
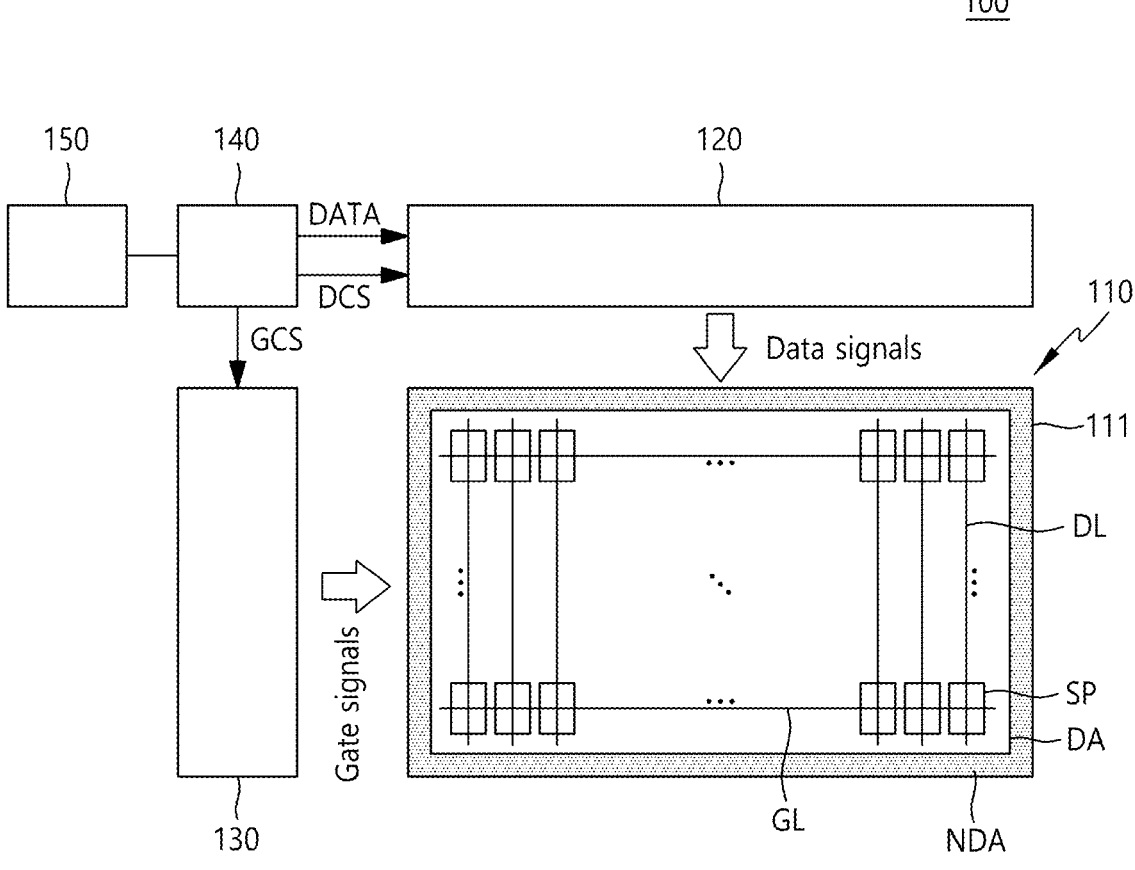
FIG. 1 illustrates an example system configuration of a display device according to aspects of the present disclosure.

Reference will now be made in detail to example embodiments of the present disclosure, examples of which can be illustrated in the accompanying drawings. In the following description, the structures, embodiments, implementations, methods and operations described herein are not limited to the specific example or examples set forth herein and can be changed as is known in the art, unless otherwise specified. Like reference numerals designate like elements throughout, unless otherwise specified. Names of the respective elements used in the following explanations are selected only for convenience of writing the specification and can thus be different from those used in actual products. Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the protected scope of the present disclosure is defined by claims and their equivalents.

In the following description, where the detailed description of the relevant known function or configuration can unnecessarily obscure aspects of the present disclosure, a detailed description of such known function or configuration can be omitted.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of" "formed of," and the like are used, one or more other elements can be added unless the term, such as "only," is used. An element described in the singular form is intended to include a plurality of elements, and vice versa, unless the context clearly indicates otherwise.

Although the terms "first," "second," "A", "B", "(a)", or "(b)", and the like can be used herein to describe various elements, these elements should not be interpreted to be limited by these terms as they are not used to define a particular order or precedence. These terms are used only to distinguish one element from another; thus, related elements should not be interpreted to be limited by these terms as they are not used to define a particular order or precedence.

Further, the expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers "disposed" or "interposed" between the elements or layers, unless otherwise specified. Further, the another element can be included in one or more of the two or more elements connected, combined, coupled, or contacted (to) one another.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers "disposed" or "interposed" between the elements or layers, unless otherwise specified.

Where positional relationships are described, for example, where the positional relationship between two parts is described using "on," "over," "under," "above,"

"below," "beside," "next," or the like, one or more other parts can be located between the two parts unless a more limiting term, such as "immediate(ly)," "direct(ly)," or "close(ly)" is used. For example, where an element or layer is disposed "on" or "over" another element or layer, one or more third or other elements or layers can be interposed therebetween. Furthermore, the terms "left," "right," "top," "bottom, "downward," "upward," "upper," "lower," and the like refer to an arbitrary frame of reference.

In describing a temporal relationship, when the temporal order is described as, for example, "after," "subsequent," "next," or "before," a case which is not continuous can be included unless a more limiting term, such as "just," "imme-diate(ly)," or "direct(ly)," is used. In construing an element, the element is to be construed as including an error or tolerance range even where no explicit description of such an error or tolerance range is provided. Further, the term "can" fully encompasses all the meanings of the term "may."

The term "at least one" should be understood as including any or all combinations of one or more of the associated listed items. For example, the meaning of "at least one of a first element, a second element, and a third element" encom-passes the combination of all three listed elements, combi-nations of any two of the three elements, as well as each individual element, the first element, the second element, and the third element.

Hereinafter, various example embodiments of the present disclosure are described in detail with reference to the accompanying drawings. In addition, for convenience of description, a scale in which each of elements is illustrated in the accompanying drawings can differ from an actual scale. Thus, the illustrated elements are not limited to the specific scale in which they are illustrated in the drawings. Further, all the components of each display device according to all embodiments of the present disclosure are operatively coupled and configured.

FIG. 1 illustrates an example system configuration of a display device 100 according to aspects of the present disclosure.

Referring to FIG. 1, in one or more example embodi-ments, the display device 100 can include a display panel 110 and a display driving circuit, as elements for display images. The display driving circuit can be a circuit for driving the display panel 110, and include a data driving circuit 120, a gate driving circuit 130, a controller 140, and other circuit components.

The display panel 110 can include a substrate 111 and a plurality of subpixels SP disposed on the substrate 111.

The substrate 111 can include a display area DA for allowing an image to be displayed and a non-display area NDA located outside of the display area DA. The non-display area NDA can surround the display area DA entirely or only in part(s).

The display area DA can also be referred to as an active area, and a plurality of subpixels SP for displaying images can be disposed in the display area DA. The non-display area NDA can also be referred to as a non-active area and can include a pad area PA.

In one or more aspects, the display panel 110 can be configured to have a very small non-display area NDA. Herein, the non-display area NDA can be also referred to as a "bezel" or an "edge." For example, the non-display area NDA can include a first non-display area located outside of the display area DA in a first direction, a second non-display area located outside of the display area DA in a second direction, a third non-display area located outside of the display area DA in a direction opposite to the first direction, and a fourth non-display area located outside of the display area DA in a direction opposite to the second direction.

The first non-display area among the first to fourth non-display areas can include a pad area to which one or more driving circuits are connected or bonded. Among the first to fourth non-display areas, the second to fourth non-display areas can have a very small size compared to the first non-display area.

In another example, a boundary area can be defined between the display area DA and the non-display area NDA. In this example, the boundary area can be bent at a certain angle to the display area DA, and thereby, the non-display area NDA can be located under the display area DA. In this implementation, when a user views the display device 100 in front thereof, all or most of the non-display area NDA may not be visible to the user. For example, the first non-display area can include the bending area. As the bending area is bent, the first non-display area may not be visible in front of the display device 100.

Various types of signal lines for driving a plurality of subpixels SP can be disposed on the substrate 111 of the display panel 110.

In one or more aspects, the display device 100 herein can be a liquid crystal display device, or the like, or a self-emission display device in which light is emitted from the display panel 110 itself. In an example where the display device 100 is the self-emission display device, each of the plurality of subpixels SP can include a light emitting ele-ment.

For example, the display device 100 according to aspects of the present disclosure can be an organic light emitting display device in which light emitting elements are imple-mented using organic light emitting diodes (OLED). In another example, the display device 100 according to aspects of the present disclosure can be an inorganic light emitting display device in which light emitting elements are implemented using inorganic material-based light emitting diodes. In further another example, the display device 100 according to aspects of the present disclosure can be a quantum dot display device in which light emitting elements are implemented using quantum dots, which are self-emis-sion semiconductor crystals.

The structure of each of the plurality of subpixels SP can depend on types of display device 100. For example, in an example where the display device 100 is a self-emission display device including self-emission subpixels SP, each subpixel SP can include a self-emission light emitting ele-ment, one or more transistors, and one or more capacitors.

The various types of signal lines can include, for example, a plurality of data lines DL for carrying data signals (which can be referred to as data voltages or image signals), a plurality of gate lines GL for carrying gate signals (which can be referred to as scan signals), and the like.

In one or more aspects, the plurality of data lines DL and the plurality of gate lines GL can intersect one another. Each of the plurality of data lines DL can be configured to extend in a first direction, and each of the plurality of gate lines GL can be configured to extend in a second direction. For example, the first direction can be the column direction, and the second direction can be the row direction. In another example, the first direction can be the row direction, and the second direction can be the column direction. Hereinafter, for merely convenience of explanation, discussions are provided based on examples where the first direction is the column direction and the second direction is the row direc-tion. Thus, although discussions are provided based on examples where each of a plurality of data lines DL is disposed in the column direction, and each of a plurality of gate lines GL is disposed in the row direction, example embodiments of the present disclosure are not limited thereto.

The data driving circuit 120 can be a circuit for driving a plurality of data lines DL and can output data signals to the plurality of data lines DL.

The data driving circuit 120 can receive image data DATA in digital form from the controller 140, convert the received image data DATA into data signals in analog form, and output the resulting data signals to the plurality of data lines DL.

In one or more aspects, the data driving circuit 120 can be connected to the display panel 110 by a tape-automated-bonding (TAB) technique, or connected to a conductive pad such as a bonding pad of the display panel 110 by a chip-on-glass (COG) technique or a chip-on-panel (COP) technique, or connected to the display panel 110 by a chip-on-film (COF) technique. However, example embodiments of the present disclosure are not limited thereto.

In one or more aspects, the data driving circuit 120 can be disposed in, and/or electrically connected to, but not limited to, one side or portion (e.g., an upper edge or a lower edge) of the display panel 110. In one or more aspects, the data driving circuit 120 can be disposed in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The data driving circuit 120 can be connected to outside, or an edge, of the display area DA of the display panel 110, or be disposed in the display area DA of the display panel 110.

The gate driving circuit 130 can be a circuit for driving a plurality of gate lines GL and can output gate signals to the plurality of gate lines GL.

The gate driving circuit 130 can receive various types of gate driving control signals GCS, and further, receive a first gate voltage corresponding to a turn-on level voltage and a second gate voltage corresponding to a turn-off level voltage. Thereby, the gate driving circuit 130 can generate gate signals and supply the generated gate signals to the plurality of gate lines GL.

In one or more aspects, the gate driving circuit 130 included in the display device 100 can be embedded into the display panel 110 by a gate-in-panel (GIP) technique. In an example where the gate driving circuit 130 is implemented by the gate-in-panel (GIP) technique, the gate driving circuit 130 can be disposed on the substrate 111 of the display panel 110 during the manufacturing process of the display panel 110 or display device 100.

For example, the gate driving circuit 130 can be disposed in the non-display area NDA of the display panel 110.

In another example, the gate driving circuit 130 can be disposed in the display area DA of the display panel 110. In this implementation, for example, the gate driving circuit 130 can be disposed in, and/or electrically connected to, but not limited to, a first area (e.g., a left area or a right area) of the display area DA of the display panel 110. In another example, the gate driving circuit 130 can be disposed in, and/or electrically connected to, but not limited to, a first area (e.g., a left area or a right area) and a second area (e.g., the right area or the left area) of the display area DA of the display panel 110.

Herein, the gate driving circuit 130 embedded in the display panel 110 by the gate-in-panel (GIP) technique can also be referred to as a "gate-in-panel circuit."

The controller 140 can be a device for controlling the data driving circuit 120 and the gate driving circuit 130, and can control driving timing for the plurality of data lines DL and driving timing for the plurality of gate lines GL.

The controller 140 can supply a data control signal DCS to the data driving circuit 120 to control the data driving circuit 120, and supply a gate control signal GCS to the gate driving circuit 130 to control the gate driving circuit 130.

The controller 140 can receive image data input from a host system 150 and supply image data DATA readable by the data driving circuit 120 based on the input image data to the data driving circuit 120.

The controller 140 can be implemented in a separate component from the data driving circuit 120, or integrated with the data driving circuit 120, so that the controller 140 and the data driving circuit 120 can be implemented in a single integrated circuit.

The controller 140 can be a timing controller used in the typical display technology or a control apparatus/device capable of additionally performing other control functionalities in addition to the typical function of the timing controller. In one or more embodiments, the controller 140 can be one or more other control circuits different from the timing controller, or a circuit or component in the control apparatus/device. The controller 140 can be implemented using various circuits or electronic components such as an integrated circuit (IC), a field programmable gate array (FPGA), an application specific integrated circuit (ASIC), a processor, and/or the like.

The controller 140 can be mounted on a printed circuit board, a flexible printed circuit, or the like, and can be electrically connected to the data driving circuit 120 and the gate driving circuit 130 through the printed circuit board, the flexible printed circuit, and/or the like.

The controller 140 can transmit signals to, and receive signals from, the data driving circuit 120 via one or more predetermined interfaces. For example, such interfaces can include a low voltage differential signaling (LVDS) interface, an embedded clock point-point interface (EPI), a serial peripheral interface (SPI), and the like. However, embodiments of the present disclosure are not limited thereto.

In one or more aspects, to provide a touch sensing function, as well as an image display function, the display device 100 can include a touch sensor, and a touch sensing circuit configured to sense the touch sensor and detect the presence or absence of a touch by an object such as a finger, a pen, or the like, or the location of the touch.

The touch sensing circuit can include a touch driving circuit configured to drive and sense the touch sensor and generate and output touch sensing data, and a touch controller capable of detecting the presence or absence of a touch or the location of the touch using the touch sensing data.

The touch sensor can include a plurality of touch electrodes. The touch sensor can further include a plurality of touch lines to electrically connect the plurality of touch electrodes to the touch driving circuit.

The touch sensor can be disposed outside of the display panel 110 in the form of a touch panel or can be disposed inside of the display panel 110. The touch sensor disposed outside of the display panel 110 can be referred to as an add-on type touch sensor. In the example where the add-on type of touch sensor is disposed in the display device 100, the touch panel and the display panel 110 can be separately manufactured and combined in an assembly process. The add-on type of touch panel can include a touch panel substrate and a plurality of touch electrodes disposed on the touch panel substrate.

In the example where the touch sensor is disposed inside of the display panel 110, the touch sensor can be formed on the substrate along with signal lines and electrodes related to display driving during the manufacturing process of the display panel 110.

The touch driving circuit can supply a touch driving signal to at least one of a plurality of touch electrodes and generate touch sensing data by sensing at least one of the plurality of touch electrodes.

The touch sensing circuit can perform touch sensing by a self-capacitance sensing method or a mutual-capacitance sensing method.

In the example where the touch sensing circuit performs touch sensing by the self-capacitance sensing method, the touch sensing circuit can perform touch sensing based on a capacitance between one or more touch electrode and an object such as a finger, a pen, and/or the like. According to the self-capacitance sensing method, each of a plurality of touch electrodes can serve as both a driving touch electrode and a sensing touch electrode. The touch driving circuit can drive all, or one or more, of a plurality of touch electrodes and sense all, or one or more, of the plurality of touch electrodes.

In the example where the touch sensing circuit performs touch sensing by the mutual-capacitance sensing method, the touch sensing circuit can perform touch sensing based on a capacitance between touch electrodes. According to the mutual-capacitance sensing method, a plurality of touch electrodes can be divided into driving touch electrodes and sensing touch electrodes. The touch driving circuit can drive the driving touch electrodes and sense the sensing touch electrodes.

In one or more aspects, the touch driving circuit and touch controller included in the touch sensing circuit can be implemented in separate devices or in a single device. In one or more aspects, the touch driving circuit and the data driving circuit can be implemented in separate devices or in a single device.

The display device 100 can further include a power supply circuit for supplying various types of power to the display driving circuit and/or the touch sensing circuit.

In one or more aspects, the display device 100 can be a mobile terminal such as a smart phone, a tablet, or the like, or a monitor, a television (TV), or the like. Such devices can be of various types, sizes, and shapes. The display device 100 according to embodiments of the present disclosure are not limited thereto, and includes displays of various types, sizes, and shapes for displaying information or images.

In one or more aspects, the display device 100 can further include an electronic device such as a camera (e.g., an image sensor), a sensor capable of detecting an object, ambient light, and the like. For example, the sensor can be a sensor capable of detecting an object or a human body by receiving light such as infrared light, ultrasonic light, ultraviolet light or the like.

Figure 2:
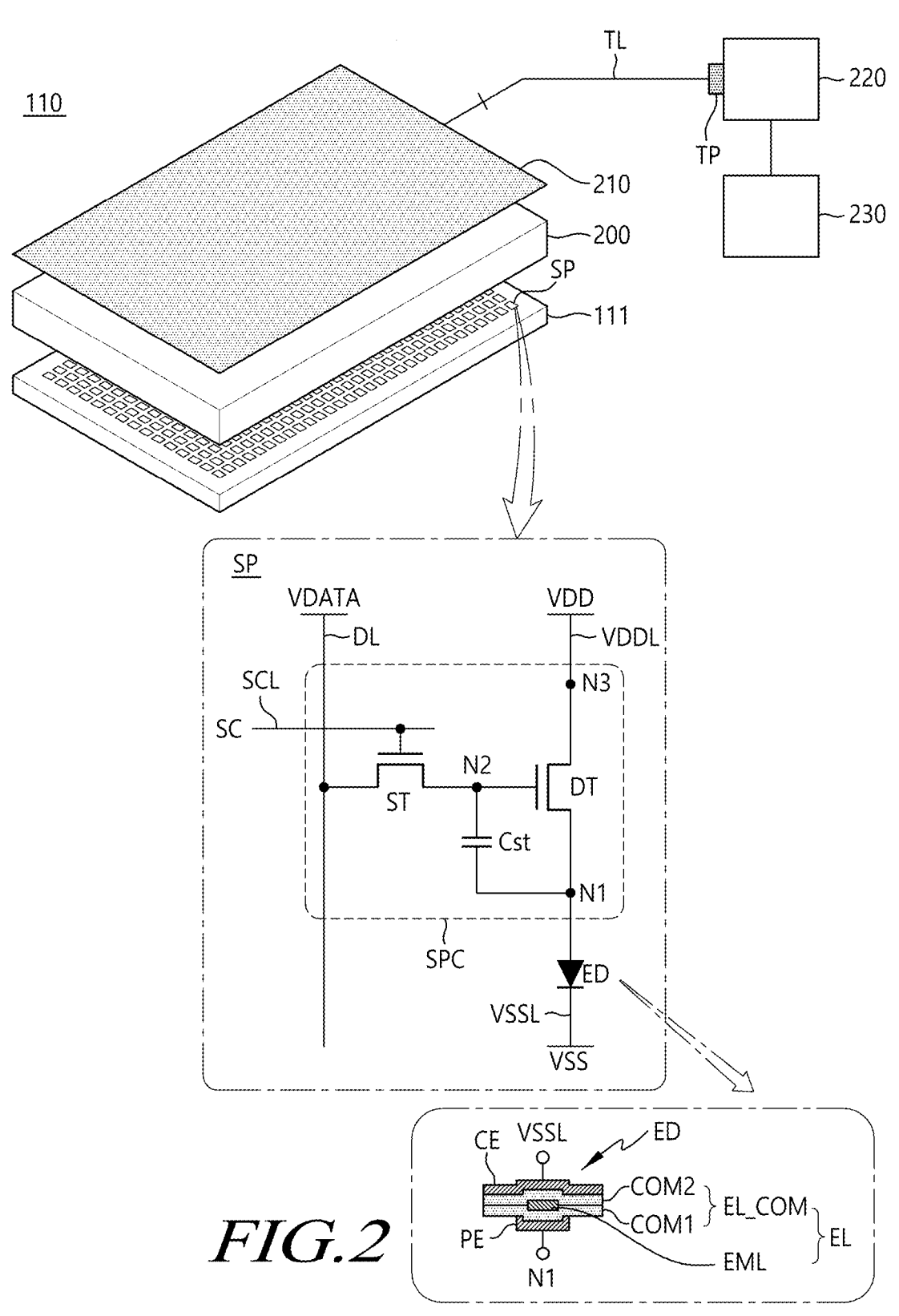
FIG. 2 illustrates an example display panel according to aspects of the present disclosure.

FIG. 2 illustrates an example configuration of the display panel 110 according to aspects of the present disclosure.

Referring to FIG. 2, the display panel 110 can include a substrate 111 on which a plurality of subpixels SP are disposed, and an encapsulation layer 200 over the substrate 111. The encapsulation layer 200 can also be referred to as an encapsulation substrate or an encapsulation stack.

In an example where the display device 100 is a self-emission display device, each of the plurality of subpixels SP disposed on the substrate 111 can include a light emitting element ED and a subpixel circuit SPC for driving the light emitting element ED.

The subpixel circuit SPC can include a plurality of transistors and at least one capacitor for driving the light emitting element ED. The subpixel circuit SPC can drive the light emitting element ED by supplying a driving current to the light emitting element ED at a predetermined timing. The light emitting element ED can emit light by being driven by the driving current.

The plurality of transistors can include a driving transistor DT for driving the light emitting element ED and a scan transistor ST configured to be turned on or off according to a scan signal SC.

The driving transistor DT can supply a driving current to the light emitting element ED.

The scan transistor ST can be configured to control an electrical state of a corresponding node in the subpixel circuit SPC or to control the state or operation of the driving transistor DT.

The at least one capacitor can include a storage capacitor Cst configured to maintain a constant voltage during a display frame or a certain period of the display frame.

To drive one or more subpixels SP, at least one data signal VDATA, which is an image signal, and at least one scan signal SC, which is a gate signal, can be applied to the one or more subpixels SP. Further, to drive one or more subpixels SP, at least one common driving voltage including a first common driving voltage VDD and a second common driving voltage VSS can be applied to the one or more subpixels SP.

The light emitting element ED can include a pixel electrode PE, an intermediate layer EL, and a common electrode CE. The intermediate layer EL can be disposed between the pixel electrode PE and the common electrode CE.

For example, the pixel electrode PE can be an electrode disposed in each subpixel SP, and the common electrode CE can be an electrode commonly disposed in a plurality of subpixels SP. For example, the pixel electrode PE can be an anode, and the common electrode CE can be a cathode. In another example, the pixel electrode PE can be a cathode, and the common electrode CE can be an anode. Hereinafter, for convenience of explanation, discussions can be provided based on examples where the pixel electrode PE is an anode, and the common electrode CE is a cathode.

In an example where the light emitting element ED is an organic light emitting diode, the intermediate layer EL can include an emission layer EML, a first common intermediate layer COM1 between the pixel electrode PE and the emission layer EML, and a second common intermediate layer COM2 between the emission layer EML and the common electrode CE. A layer including the first common intermediate layer COM1 and the second common intermediate layer COM2 can be referred to as a common intermediate layer EL_COM.

The emission layer EML can be disposed in each subpixel SP, and the common intermediate layer EL_COM can be commonly disposed across a plurality of subpixels SP.

The emission layer EML can be disposed in each light emitting area, and the common intermediate layer EL_COM can be commonly disposed across a plurality of light emitting areas and a plurality of non-light emitting areas.

For example, the first common intermediate layer COM1 can include a hole injection layer (HIL), a hole transfer layer (HTL), and the like. The second common intermediate layer COM2 can include an electron transport layer (ETL), an electron injection layer (EIL), and the like.

The hole injection layer can inject holes from the pixel electrode PE to the hole transport layer, the hole transport layer can transport holes to the emission layer EML, the electron injection layer can inject electrons from the common electrode CE to the electron transport layer, and the electron transport layer can transport electrons to the emission layer EML.

For example, the common electrode CE can be electrically connected to a second common driving voltage line VSSL. The second common driving voltage VSS can be applied to the common electrode CE through the second common driving voltage line VSSL. The pixel electrode PE can be electrically connected directly or indirectly (via another transistor) to a first node N1 of the corresponding driving transistor DT of each subpixel SP. Herein, the second common driving voltage VSS can also be referred to as a "base voltage", and the second common driving voltage line VSSL can also be referred to as a "low power supply voltage line", a "low voltage line", or a "base voltage line.

Each light emitting element ED can be configured by overlapping of a corresponding pixel electrode PE, a corresponding emission layer EML in the commonly disposed intermediate layer EL, and a corresponding portion of the commonly disposed common electrode CE. A corresponding light emitting area can be formed by each light emitting element ED. For example, a corresponding light emitting area of each light emitting element ED can include an area where a corresponding pixel electrode PE, a corresponding emission layer EML in the commonly disposed intermediate layer EL, and a corresponding portion of the commonly disposed common electrode CE overlap with each other.

In one or more aspects, each light emitting element ED can be an organic light emitting diode (OLED), an inorganic light emitting diode (LED), or a quantum dot light emitting element. In an example where each light emitting element ED is an organic light emitting diode OLED, a corresponding intermediate layer EL of each light emitting element ED can be a layer including an organic material.

The driving transistor DT can be a transistor configured to supply a driving current to the light emitting element ED. The driving transistor DT can be connected between a first common driving voltage line VDDL and the light emitting element ED.

The driving transistor DT can include a first node N1, a second node N2, and a third node N3. The first node N1 can be electrically connected to the light emitting element ED. A data signal VDATA can be applied to the second node N2. The first common driving voltage VDD transmitted through the first common driving voltage line VDDL can be applied to the third node N3.

In the driving transistor DT, the second node N2 can be a gate node, the first node N1 can be a source node or a drain node, and the third node N3 can be the drain node or the source node. Hereinafter, for merely convenience of explanation, discussions can be provided based on examples where the first, second, and third nodes (N1, N2, and N3) of the driving transistor DT are source, gate, and drain nodes, respectively. However, example embodiments of the present disclosure are not limited thereto.

The scan transistor ST included in the subpixel circuit SPC illustrated in FIG. 2 can be a switching transistor for allowing a data signal VDATA, which is an image signal, to be supplied to the second node N2, which is the gate node of the driving transistor DT.

The scan transistor ST can be turned on or turned off by a scan signal SC, which is a type of gate signal, applied through a scan line SCL, which is a type of gate line GL, and control an electrical connection between the second node N2 of the driving transistor DT and a data line DL. The drain electrode or source electrode of the scan transistor ST can be electrically connected to the data line DL. The source electrode or drain electrode of the scan transistor ST can be electrically connected to the second node N2 of the driving transistor DT. The gate electrode of the scan transistor ST can be electrically connected to the scan line SCL.

The storage capacitor Cst can be electrically connected between the first node N1 and the second node N2 of the driving transistor DT. The storage capacitor Cst can include a first capacitor electrode electrically connected to the first node N1 of the driving transistor DT or corresponding to the first node N1 of the driving transistor DT, and a second capacitor electrode electrically connected to the second node N2 of the driving transistor DT or corresponding to the second node N2 of the driving transistor DT.

The storage capacitor Cst can be an external capacitor intentionally designed to be located outside of the driving transistor DT, and therefore, be different from an internal capacitor such as a parasitic capacitor (e.g., a Cgs, a Cgd) that can be formed between the first node N1 and the second node N2 of the driving transistor DT.

Each of the driving transistor DT and the scan transistor ST can be an n-type transistor or a p-type transistor.

The display panel 110 can have a top emission structure or a bottom emission structure.

In an example where the display panel 110 has the top emission structure, at least a portion of the subpixel circuit SPC can overlap with at least a portion of the light emitting element ED in the vertical direction. In this configuration, the area or size of a corresponding light emitting area can increase, and a corresponding aperture ratio can increase.

In an example where the display panel 110 has the bottom emission structure, the subpixel circuit SPC may not overlap with the light emitting element ED in the vertical direction.

The subpixel circuit SPC can include two transistors (2T: DT and ST) and one capacitor (1C: Cst) (which can be referred to as a "2T1C structure"), and in some implementations, can further include one or more transistors, or further include one or more capacitors.

For example, the subpixel circuit SPC can have an 8T1C structure including 8 transistors and 1 capacitor. In another example, the subpixel circuit SPC can have an 6T2C structure including 6 transistors and 2 capacitor. In further another example, the subpixel circuit SPC can have an 7T1C structure including 7 transistors and 1 capacitor. However, example embodiments of the present disclosure are not limited to such specific structures.

The types and number of gate signals supplied to a subpixel SP, and/or the types and number of gate lines connected to the subpixel SP can vary depending on a structure of a corresponding subpixel circuit SPC. Further, the types and number of common pixel driving voltages supplied to a subpixel SP can vary depending on a structure of a corresponding subpixel circuit SPC.

Since circuit elements (e.g., light emitting elements ED such as organic light emitting diodes (OLED) including an organic material) in each subpixel SP are vulnerable to external moisture or oxygen, an encapsulation layer 200 can be disposed in the display panel 110 in order to prevent the external moisture or oxygen from penetrating into the circuit elements (e.g., the light emitting elements ED).

The encapsulation layer 200 can be disposed in various shapes or configurations to prevent light emitting elements ED from contacting moisture or oxygen. For example, the encapsulation layer 200 can include two or more layers in which one or more organic layers and one or more inorganic layers are alternately stacked, but example embodiments of the present disclosure are not limited thereto.

In one or more aspects, to sense a touch of a user, the display device 100 can include a touch sensor layer 210 including a plurality of sensor electrodes, a touch driving circuit 220 configured to sense the plurality of sensor electrodes, and a touch controller 230 configured to determine whether a touch is applied or a location of the touch (e.g., touch coordinates) based on the sensing result (e.g., touch sensing data) of the touch driving circuit 220.

The touch sensor layer 210 can be embedded in the display panel 110. For example, the touch sensor layer 210 can be disposed on the encapsulation layer 200 of the display panel 110.

The display panel 110 can further include a plurality of touch pads TP to which the touch driving circuit 220 is electrically connected, and a plurality of touch routing lines for electrically connecting the plurality of sensor electrodes included in the touch sensor layer 210 to the plurality of touch pads TP to which the touch driving circuit 220 is electrically connected.

Figure 3:
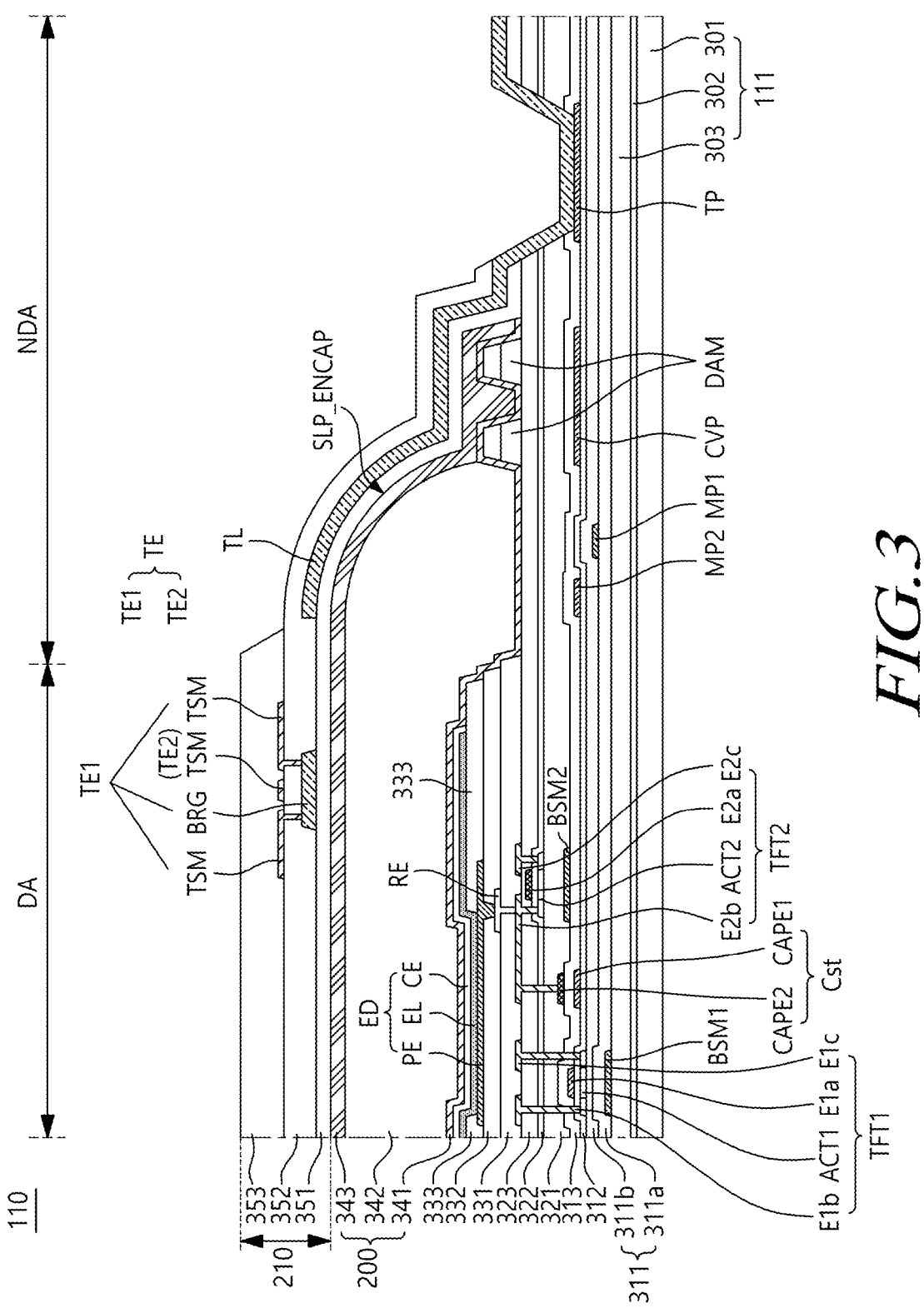
FIG. 3 is an example cross-sectional view of the display panel according to aspects of the present disclosure.

FIG. 3 is an example cross-sectional view of the display panel 110 according to aspects of the present disclosure.

Referring to FIG. 3, in one or more example embodiments, in terms of stack-up configuration, the display panel 110 can include a transistor forming part, a light emitting element forming part, and an encapsulation part.

A substrate 111 can be in the form of a single layer or multiple layers. In an example where the substrate 111 is in the form of multiple layers, the substrate 111 can include a first substrate 301, an intermediate substrate layer 302, and a second substrate 303. The intermediate substrate layer 302 can be located between the first substrate 301 and the second substrate 303. For example, each of the first substrate 301 and the second substrate 303 can be a polyimide (PI) layer. The intermediate substrate layer 302 can be an inorganic insulating layer. When charges are stored in the first substrate 301, which is the polyimide layer, the intermediate substrate layer 302 can block the charges from affecting one or more transistors disposed on the second substrate 303, which is the polyimide layer.

In addition, the intermediate substrate layer 302 can block moisture from penetrating upwardly through the first substrate 301. For example, the intermediate substrate layer 302 can be in the form of a single layer of silicon nitride (SiNx) or silicon oxide (SiOx) or a multilayer thereof, or can be in the form of a double layer of silicon dioxide (SiO2) and silicon nitride (SiNx). However, example embodiments of the present disclosure are not limited thereto.

The transistor forming part can include the substrate 111, various types of insulating layers (311, 312, 313, 321, 322, and 323) on the substrate 111, various types of transistors (TFT1 and TFT2), a storage capacitor Cst, and various electrodes or signal lines.

The transistors (TFT1 and TFT2) included in the transistor forming part can include a first transistor TFT1 and a second transistor TFT2.

The first transistor TFT1 can include a first active layer ACT1, a first electrode E1a, a second electrode E1b, and a third electrode E1c. The first active layer ACT1 can be a first semiconductor layer, but example embodiments of the present disclosure are not limited thereto. For example, the first active layer ACT1 can be configured with an oxide semiconductor, amorphous silicon, polysilicon, low-temperature polysilicon (LTPS), or the like, but example embodiments of the present disclosure are not limited thereto. The first transistor TFT1 can be a p-channel transistor or an n-channel transistor, but example embodiments of the present disclosure are not limited thereto.

The first electrode E1a can be a gate electrode, the second electrode E1b can be a source electrode or a drain electrode, and the third electrode E1c can be the drain electrode or the source electrode. Hereinafter, for convenience of explanation, discussions can be provided based on examples where the first, second, and third electrodes (E1a, E1b, and E1c) are a first gate electrode E1a, a first source electrode E1b, and a first drain electrode E1c, respectively. However, example embodiments of the present disclosure are not limited thereto.

The second transistor TFT2 can include a second active layer ACT2, a fourth electrode E2a, a fifth electrode E2b, and a sixth electrode E2c. The second active layer ACT2 can be a second semiconductor layer, but example embodiments of the present disclosure are not limited thereto. For example, the second active layer ACT2 can be configured with an oxide semiconductor, amorphous silicon, polysilicon, low-temperature polysilicon (LTPS), or the like, but example embodiments of the present disclosure are not limited thereto. The second transistor TFT2 can be a p-channel transistor or an n-channel transistor, but example embodiments of the present disclosure are not limited thereto.

For example, one of the first transistor TFT1 and the second transistor TFT2 can include an active layer formed from an oxide semiconductor. In another example, one of the first transistor TFT1 and the second transistor TFT2 can include an active layer formed from low-temperature polysilicon. In another example, the first transistor TFT1 and the second transistor TFT2 can include active layers formed from an oxide semiconductor. In another example, the first transistor TFT1 and the second transistor TFT2 can include active layers formed from low-temperature polysilicon. In another example, among the first transistor TFT1 and the second transistor TFT2, a driving transistor DT can include an active layer formed from an oxide semiconductor, and a scan transistor ST can include an active layer formed from low-temperature polysilicon. In another example, among the first transistor TFT1 and the second transistor TFT2, a driving transistor DT can include an active layer formed from low-temperature polysilicon, and a scan transistor ST can include an active layer formed from an oxide semiconductor. In another example, one or more transistors included in the gate driving circuit 130 configured in the gate-in-panel (GIP) type can include active layers formed from an oxide semiconductor or low temperature polysilicon. In another example, all of transistors disposed on the substrate 111 and transistors included in the gate driving circuit 130 configured in the gate-in-panel (GIP) type can include active layers formed from an oxide semiconductor.

The fourth electrode E2a can be a gate electrode, the fifth electrode E2b can be a source electrode or a drain electrode, and the sixth electrode E2c can be the drain electrode or the source electrode. Hereinafter, for convenience of explanation, discussions can be provided based on examples where the fourth, fifth, and sixth electrodes (E2a, E2b, and E2c) are a second gate electrode E2a, a second source electrode E2b, and a second drain electrode E2c, respectively. However, example embodiments of the present disclosure are not limited thereto.

The second active layer ACT2 of the second transistor TFT2 can be located higher from the substrate 111 than the first active layer ACT1 of the first transistor TFT1.

A first buffer layer 311 can be disposed under the first active layer ACT1 of the first transistor TFT1, and a second buffer layer 321 can be disposed under the second active layer ACT2 of the second transistor TFT2. For example, the first active layer ACT1 of the first transistor TFT1 can be located on the first buffer layer 311, and the second active layer ACT2 of the second transistor TFT2 can be located on the second buffer layer 321. The second buffer layer 321 can be located higher from the substrate 111 than the first buffer layer 311.

The storage capacitor Cst can be disposed in various metal layers in the display panel 110. For example, the storage capacitor Cst can include a first capacitor electrode CAPE1 and a second capacitor electrode CAPE2.

The light emitting element forming part can include a plurality of light emitting elements ED disposed on at least one planarization layer (331, and/or 332). Each of the light emitting elements ED can include a pixel electrode PE, an intermediate layer EL, and a common electrode CE.

The encapsulation part can include an encapsulation layer 200 on the plurality of light emitting elements ED. The encapsulation layer 200 can be in the form of a single layer or multiple layers. In addition to the encapsulation layer 200, the encapsulation part can further include at least one dam DAM.

Hereinafter, the stack-up configuration of the display panel 110 according to example embodiments of the present disclosure is be described in more detail with reference to FIG. 3.

The first buffer layer 311 can be disposed on the substrate 111. The first buffer layer 311 can be in the form of a single layer or multiple layers. In an example where the first buffer layer 311 is in the form of multiple layers, the first buffer layer 311 can include a multi-buffer layer 311a and an active buffer layer 311b.

The first active layer ACT1 of the first transistor TFT1 can be disposed on the first buffer layer 311. The first active layer ACT1 can include a channel region where a channel is formed, a source connection region on a first side of the channel region, and a drain connection region on a second opposing side of the channel region.

A first gate insulating layer 312 can be disposed on the first active layer ACT1 of the first transistor TFT1. The first gate electrode Ela of the first transistor TFT1 can be disposed on the first gate insulating layer 312. A first interlayer insulating layer 313 can be disposed on the first gate electrode Ela of the first transistor TFT1.

The second buffer layer 321 can be disposed on the first interlayer insulating layer 313.

The second active layer ACT2 of the second transistor TFT2 can be disposed on the second buffer layer 321. The second active layer ACT2 can include a channel region where a channel is formed, a source connection region on a first side of the channel region, and a drain connection region on a second opposing side of the channel region.

A second gate insulating layer 322 can be disposed on the second active layer ACT2 of the second transistor TFT2. The second gate electrode E2a of the second transistor TFT2 can be disposed on the second gate insulating layer 322. A second interlayer insulating layer 323 can be disposed on the second gate electrode E2a of the second transistor TFT2.

The first source electrode E1b and the first drain electrode E1c of the first transistor TFT1 and the second source electrode E2b and the second drain electrode E2c of the second transistor TFT2 can be disposed on the second interlayer insulating layer 323.

The first source electrode E1b and the first drain electrode E1c of the first transistor TFT1 can be connected to the source connection region and the drain connection region of the first active layer ACT1 respectively through holes in the second interlayer insulating layer 323, the second gate insulating layer 322, the second buffer layer 321, the first interlayer insulating layer 313, and the first gate insulating layer 312.

The second source electrode E2b and the second drain electrode E2c of the second transistor TFT2 can be connected to the source connection region and drain connection region of the second active layer ACT2 respectively through holes in the second interlayer insulating layer 323 and the second gate insulating layer 322.

The first source electrode E1b and the first drain electrode E1c of the first transistor TFT1 and the second source electrode E2b and the second drain electrode E2c of the second transistor TFT2 can include a first metal and can be disposed in a first metal layer. For example, the first metal and the first metal layer can be referred to as a first source-drain metal and a first source-drain metal layer, respectively.

In one or more aspects, the storage capacitor Cst can be configured with the first capacitor electrode CAPE1 and the second capacitor electrode CAPE2. In one or more aspects, the storage capacitor Cst can include three or more capacitor electrodes, or can include two or more capacitors connected in parallel.

Each of the first capacitor electrode CAPE1 and the second capacitor electrode CAPE2 can be disposed in various metal layers in the display panel 110.

In one or more aspects, the first capacitor electrode CAPE1 can include the same first gate metal as the first gate electrode Ela of the first transistor TFT1 on the first gate insulating layer 312, and be disposed in a first gate metal layer.

In one or more aspects, the second capacitor electrode CAPE2 can be disposed on the first interlayer insulating layer 313.

The second source electrode E2b of the second transistor TFT2 can be electrically connected to the second capacitor electrode CAPE2 through holes in the second interlayer insulating layer 323, the second gate insulating layer 322, and the second buffer layer 321.

For example, the first transistor TFT1 can be the scan transistor ST of FIG. 2, and the second transistor TFT2 can be the driving transistor DT of FIG. 2.

The transistor forming part can further include various metal layers (e.g., a first metal layer MP1, a second metal layer MP2, and the like). For example, the first metal layer MP1 can be disposed between the multi-buffer layer 311a and the active buffer layer 311b included in the first buffer layer 311. The second metal layer MP2 can include the same first gate metal as the first gate electrode Ela of the first transistor TFT1 and can be disposed in the first gate metal layer. In one or more aspects, the first metal layer MP1 can be a first metal pattern, and the second metal layer MP2 can be a second metal pattern. However, example embodiments of the present disclosure are not limited thereto.

Each of the first metal layer MP1 and the second metal layer MP2 can be disposed in the display area DA or the non-display area NDA.

The transistor forming part can further include a first shield metal BSM1 disposed on the substrate 111, overlapping with the first active layer ACT1 of the first transistor TFT1, and disposed under the first active layer ACT1 of the first transistor TFT1. For example, the first shield metal BSM1 can be disposed between the substrate 111 and the first buffer layer 311, or can be disposed between the multi-buffer layer 311a and the active buffer layer 311b.

The transistor forming part can further include a second shield metal BSM2 disposed on the substrate 111, overlapping with the second active layer ACT2 of the second transistor TFT2, and disposed under the second active layer ACT2 of the second transistor TFT2.

For example, the second shield metal BSM2 can be disposed in a metal layer between the first interlayer insulating layer 313 and the second buffer layer 321. The second shield metal BSM2 can be disposed in the same metal layer as the second capacitor CAPE2.

In another example, the second shield metal BSM2 can be disposed in the same first gate metal layer as the first gate electrode Ela of the first transistor TFT1. Referring to FIG. 3, the transistor forming part can further include a common driving voltage pattern CVP to which a common driving voltage is applied. The common driving voltage applied to the common driving voltage pattern CVP can be a power signal, and for example, can be the first common driving voltage VDD or the second common driving voltage VSS in FIG. 2. The first common driving voltage VDD can be referred to as a high power supply voltage (or a high-potential power signal), and the second common driving voltage VSS can be referred to as a low power supply voltage (or a low-potential power signal) or a base voltage.

The common driving voltage pattern CVP can be disposed in the display area DA or the non-display area NDA.

At least one planarization layer can be disposed on the first transistor TFT1 and the second transistor TFT2. FIG. 3 illustrates, for example, two planarization layers (first and second planarization layers 331 and 332) disposed on the first transistor TFT1 and the second transistor TFT2. In one or more aspects, three or more planarization layers can be disposed on the first transistor TFT1 and the second transistor TFT2 according to design requirements. However, example embodiments of the present disclosure are not limited thereto.

Referring to FIG. 3, the first planarization layer 331 be disposed on the first source electrode E1b and the first drain electrode E1c of the first transistor TFT1 and the second source electrode E2b and the second drain electrode E2c of the second transistor TFT2. In one or more aspects, the first planarization layer 331 can be configured to cover both the first transistor TFT1 and the second transistor TFT2.

A relay electrode RE can be disposed on the first planarization layer 331. The relay electrode RE can be electrically connected to the second source electrode E2b of the second transistor TFT2 through a hole in the first planarization layer 331. For example, the second source electrode E2b of the second transistor TFT2 can be electrically connected to the second capacitor electrode CAPE2 of the storage capacitor Cst.

The relay electrode RE can be disposed in a second metal layer on the first planarization layer 331, and include a second metal. The second metal and the second metal layer can be referred to as a second source-drain metal and a second source-drain metal layer, respectively.

The second planarization layer 332 can be disposed on the relay electrode RE.

The light emitting element forming part can be disposed on the second planarization layer 332. A light emitting element ED can be formed on the second planarization layer 332. The light emitting element ED can include a pixel electrode PE, an intermediate layer EL, and a common electrode CE. A light emitting area of the light emitting element ED can be formed by an area where the pixel electrode PE, the intermediate layer EL, and the common electrode CE overlap and contact each other.

The pixel electrode PE can be disposed on the second planarization layer 332, and a bank 333 can be disposed on the pixel electrode PE. An opening of the bank 333 can expose a portion of the pixel electrode PE to form the light emitting area. For example, the opening of the bank 333 can overlap with a portion of the pixel electrode PE.

The intermediate layer EL of the light emitting element ED can be disposed on a portion of the pixel electrode PE and the bank 333. The common electrode CE can be disposed on the intermediate layer EL.

The encapsulation part can be disposed on the light emitting element forming part, and be located on the common electrode CE. The encapsulation part can include an encapsulation layer 200 disposed on the common electrode CE.

The encapsulation layer 200 can prevent moisture or oxygen from penetrating into the light emitting element ED. For example, the encapsulation layer 200 can prevent moisture or oxygen from penetrating into an organic material contained in the intermediate layer EL of the light emitting element ED. In one or more aspects, the encapsulation layer 200 can be in the form of a single layer or multiple layers, but example embodiments of the present disclosure are not limited thereto.

For example, the encapsulation layer 200 can include a first encapsulation layer 341, a second encapsulation layer 342, and a third encapsulation layer 343. The first encapsulation layer 341 and the third encapsulation layer 343 can include, for example, an inorganic layer, and the second encapsulation layer 342 can include, for example, an organic layer.

In one or more aspects, a touch sensor can be embedded in the display panel 110. In this implementation, the display panel 110 can include a touch sensor layer 210 disposed on the encapsulation layer 200. For example, the touch sensor layer 210 can be a layer in which the touch sensor is configured.

The touch sensor layer 210 can include a plurality of touch electrodes TE, and can include sensor metals TSM and bridge metals BRG to form the plurality of touch electrodes TE. Herein, the sensor metals TSM can be also referred to as sensor metal layers TSM, and the bridge metals BRG can be also referred to as bridge metal layers BRG.

The touch sensor layer 210 can further include one or more insulating layers such as a sensor buffer layer 351 on the encapsulation layer 200, a sensor interlayer insulating layer 352 on the sensor buffer layer 351, and a sensor protective layer 353 on the sensor interlayer insulating layer 352. In one or more aspects, the sensor buffer layer 351 can be omitted.

The bridge metals BRG can be disposed between the sensor buffer layer 351 and the sensor interlayer insulating layer 352, and the sensor metals TSM can be disposed between the interlayer insulating layer 352 and the sensor protective layer 353.

Each of the plurality of touch electrodes TE can include one or more sensor metals TSM. Each of the plurality of touch electrodes TE can be an electrode patterned in a mesh configuration (hereinafter, which can be referred to as a mesh-type electrode) and thus, having a plurality of openings.

The plurality of touch electrodes TE can include one or more first touch electrodes TE1 and one or more second touch electrodes TE2. Two or more sensor metals TSM included in the first touch electrode TE1 can be electrically connected through one or more bridge metals BRG. For example, two or more sensor metals TSM spaced apart from each other can be electrically connected by one or more bridge metals BRG to form one first touch electrode TE1.

The bridge metals BRG can be disposed on the sensor buffer layer 351, and the sensor interlayer insulating layer 352 can be disposed on the bridge metals BRG. The sensor metals TSM can be disposed on the sensor interlayer insulating layer 352. Two or more of the sensor metals TSM can be connected to one or more bridge metals BRG through two or more respective holes in the sensor interlayer insulating layer 352.

The sensor metals TSM and the bridge metals BRG can be configured not to overlap with the light emitting element ED. The sensor metals TSM and the bridge metals BRG can overlap with the bank 333.

In one or more aspects, a plurality of sensor metals TSM can be included in one touch electrode TE, and electrically connected to each other. In this implementation, each of the plurality of sensor metals TSM can be patterned in a mesh configuration. In one or more aspects, one or more of sensor metals TSM (or a part of a sensor metal TSM) and other one or more, the other one or more, of the sensor metals TSM (or another, or the other, part of the sensor metal TSM) can be electrically connected to each other through one or more bridge metals BRG to form one touch electrode TE.

The sensor protective layer 353 can be configured to cover the sensor metals TSM and the bridge metals BRG.

A touch line TL can electrically connect a touch electrode TE to a touch pad TP. The touch line TL can be configured with at least one of a sensor metal TSM and a bridge metal BRG.

In an example where the display panel 110 is a display panel in which a touch sensor is embedded, the touch line TL can extend along an outer slope SLP_ENCAP (e.g., an inclined side surface) of the encapsulation layer 200 and an upper portion of at least one dam DAM and extend to a touch pad TP located in the non-display area NDA.

Figure 4:
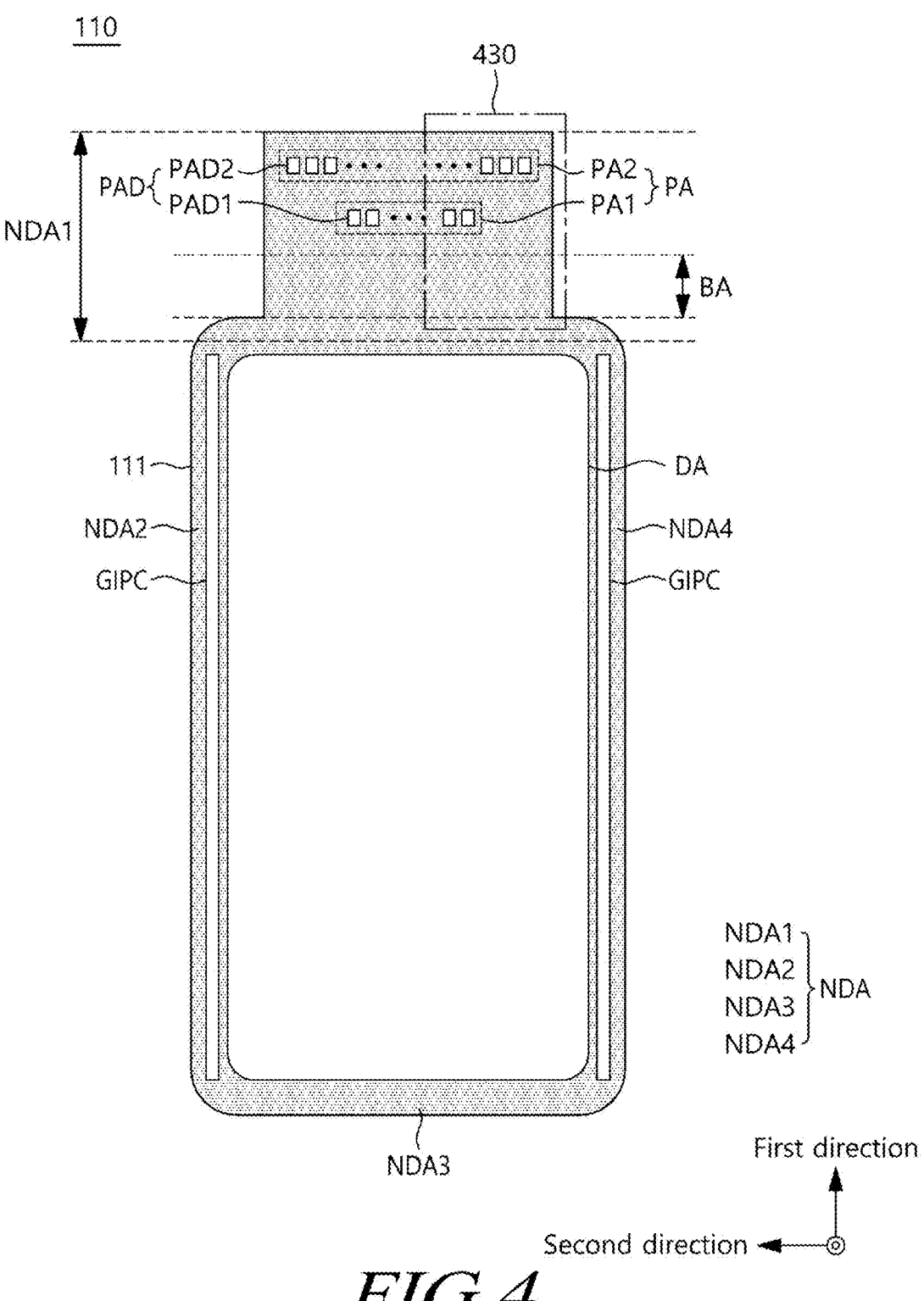
FIG. 4 is an example plan view of the display panel according to aspects of the present disclosure.

FIG. 4 is an example plan view of the display panel 110 according to aspects of the present disclosure.

Referring to FIG. 4, in one or more example embodiments, the display panel 110 can include a display area DA allowing an image to be displayed and a non-display area NDA in which an image is not displayed.

For example, the non-display area NDA can include a first non-display area NDA1 located outside of the display area DA in a first direction, a second non-display area NDA2 located outside of the display area DA in a second direction different from the first direction, a third non-display area NDA3 located outside of the display area DA in a direction opposite to the first direction, and a fourth non-display area NDA4 located outside of the display area DA in a direction opposite to the second direction.

The first non-display area NDA1 can include a bending area BA and a pad area PA where a plurality of pads PAD are disposed. The bending area BA can be located closer to the display area DA among the display area DA and the pad area PA.

The pad area PA can include a first pad area PA1 where a plurality of first pads PAD1 are disposed and a second pad area PA2 where a plurality of second pads PAD2 are disposed.

The first pad area PA1 can be located between the second pad area PA2 and the display area DA. For example, the second pad area PA2 can be located further outwardly than the first pad area PA1. The second pad area PA2 can be located farther away from the bending area BA than the first pad area PA1.

In an example where the gate driving circuit 130 is implemented as a gate-in-panel circuit GIPC, which is configured in the gate-in-panel (GIP) type, one or more gate-in-panel circuits GIPC can be disposed in at least one of the second non-display area NDA2 and the fourth non-display area NDA4. Hereinafter, for convenience of explanation, discussions are provided based on examples where one or more gate-in-panel circuits GIPC are disposed in both the second non-display area NDA2 and the fourth non-display area NDA4. However, example embodiments of the present disclosure are not limited thereto.

The display area DA and the non-display area NDA can be defined in the substrate 111 of the display panel 110. For example, the display area DA, the first non-display area NDA1, the second non-display area NDA2, the third non-display area NDA3, and the fourth non-display area NDA4 can be defined in the substrate 111. The bending area BA, the first pad area PA1, and the second pad area PA2 can be located in the first non-display area NDA1.

Figure 5:
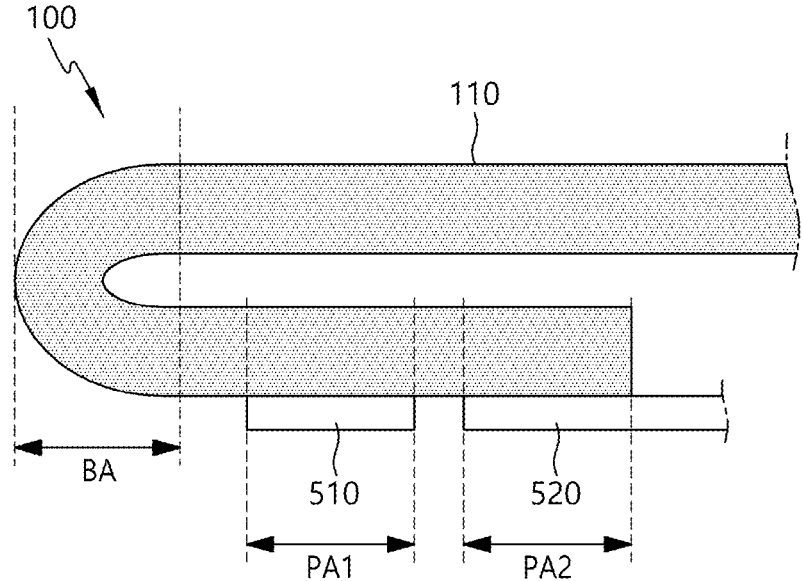
FIG. 5 is an example lateral view of the display panel according to aspects of the present disclosure.

FIG. 5 is an example lateral view of the display panel 110 according to aspects of the present disclosure.

Referring to FIG. 5, the display panel 110 can be configured to be bent in the bending area BA. Referring to FIGS. 4 and 5, the first pad area PA1 and the second pad area PA2 can be located further outwardly than the bending area BA, and the second pad area PA2 can be located further outwardly than the first pad area PA1.

Referring to FIG. 5, in one or more aspects, the display device 100 can further include a driving chip 510 connected to the first pad area PA1 and a printed circuit 520 connected to the second pad area PA2. The first pad area PA1 can be located between the second pad area PA2 and the display area DA.

For example, the driving chip 510 can be an integrated circuit chip in which the data driving circuit 120 is implemented. In another example, the driving chip 510 can be an integrated circuit chip in which the data driving circuit 120 and the touch driving circuit 220 are integrally implemented.

The printed circuit 520 can be a flexible printed circuit board (FPCB).

Figure 6:
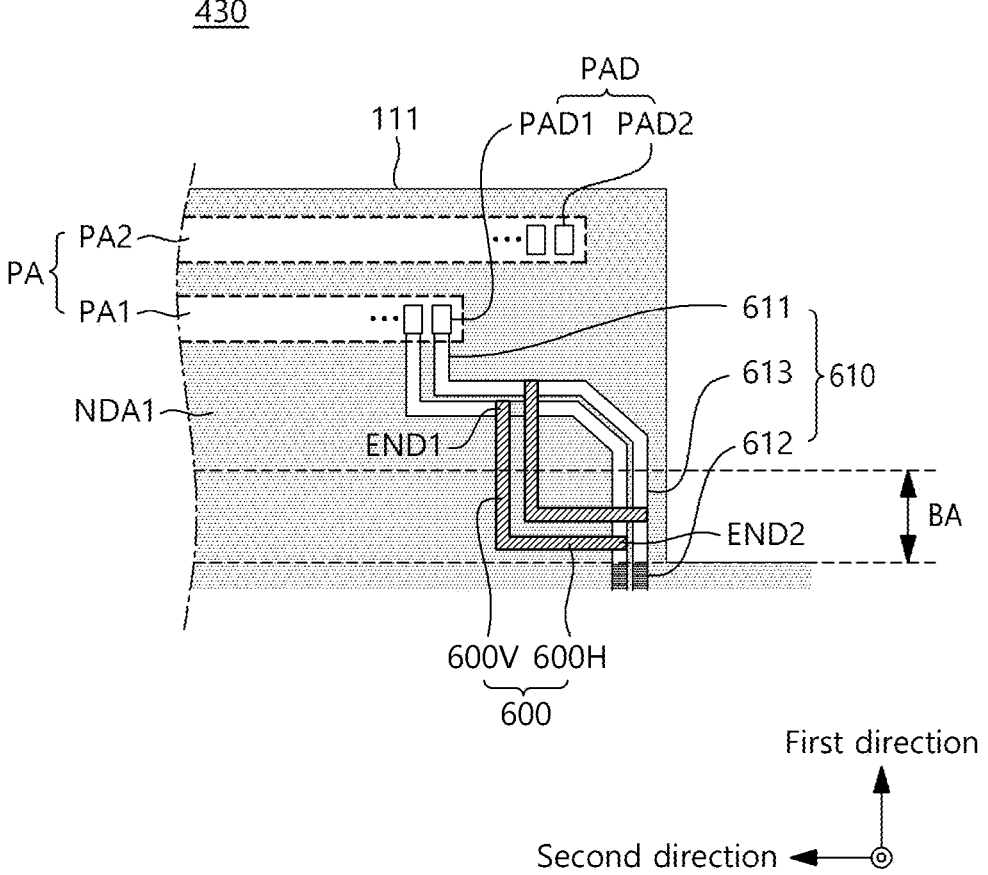
FIG. 6 is a plan view illustrating an example signal transfer structure disposed in a portion of a first non-display area of the display panel according to aspects of the present disclosure.
Figure 7:
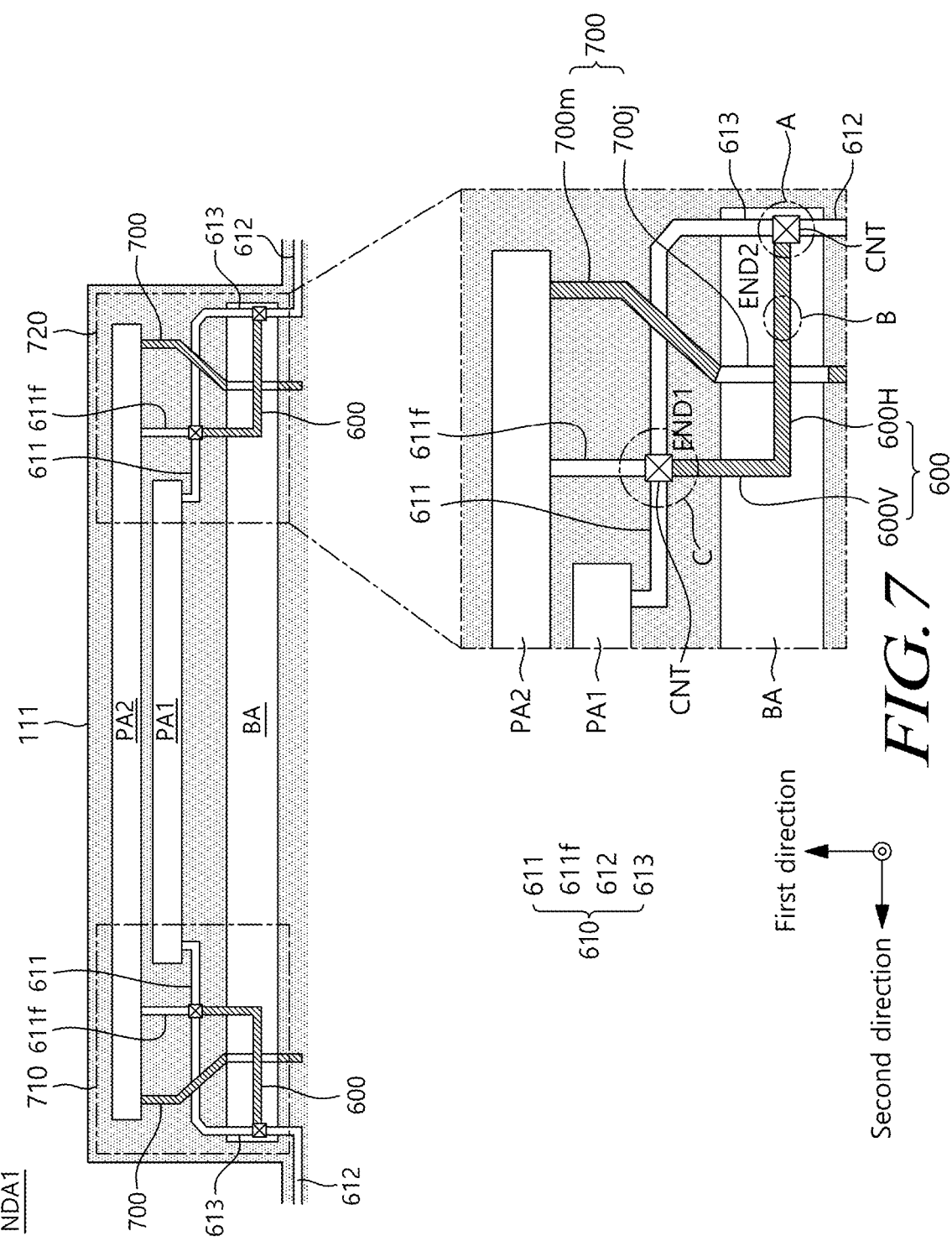
FIG. 7 is an example plan view illustrating one or more example signal transfer structures disposed in the first non-display area of the display panel according to aspects of the present disclosure.

FIG. 6 is a plan view illustrating an example signal transfer structure disposed in a portion of the first non-display area NDA1 of the display panel 110 according to aspects of the present disclosure, and illustrates a portion 430 of the first non-display area NDA1 of FIG. 4 discussed above. FIG. 7 is an example plan view illustrating one or more example signal transfer structures disposed in the first non-display area NDA1 of the display panel 110 according to aspects of the present disclosure.

Referring to FIGS. 6 and 7, a portion 430 of the first non-display area NDA1 can include respective portions of the bending area BA and the pad area PA. For example, the substrate 111 can include the first non-display area NDA1 including the bending area BA and the pad area PA. The pad area PA can include the first pad area PA1 and the second pad area PA2.

In one or more aspects, the display panel 110 can include, to transfer signals, one or more signal lines 610 disposed in the first non-display area NDA1 and electrically connected to corresponding one or more pads PAD disposed in the pad area PA, and one or more protective link lines 600 electrically connected to the one or more signal lines 610.

The one or more signal lines 610 connected to the one or more protective link lines 600 can be crack-vulnerable lines with a high possibility of cracking due to bending of the bending area BA.

Referring to FIG. 7, a signal transfer structure configured with one or more signal lines 610 and one or more protective link lines 600 can be disposed in at least one of a first signal transfer area 710 and a second signal transfer area 720 of the first non-display area NDA1.

For example, when a gate-in-panel circuit GIPC (e.g., the gate-in-panel circuit GIPC in FIG. 4) is disposed in the second non-display area NDA2, a signal transfer structure can be disposed in the first signal transfer area 710, which is close to the second non-display area NDA2, among the first signal transfer area 710 and the second signal transfer area 720 of the first non-display area NDA1.

In another example, when the gate-in-panel circuit GIPC is disposed in the fourth non-display area NDA4, a signal transfer structure can be disposed in the second signal transfer area 720, which is close to the fourth non-display area NDA4, among the first signal transfer area 710 and the second signal transfer area 720 of the first non-display area NDA1.

In another example, when gate-in-panel circuits GIPC are disposed in the second non-display area NDA2 and the fourth non-display area NDA4, as shown in FIG. 7, signal transfer structures can be disposed in the first signal transfer area 710 and the second signal transfer area 720 of the first non-display area NDA1, respectively.

For convenience of explanation, although FIGS. 6 and 7 illustrate one or two signal lines 610, three or more signal lines 610 and three or more protective link lines 600 can be disposed. FIG. 6 can be a plan view of the second signal transfer area 720 of FIG. 7.

Referring to FIGS. 6 and 7, one or more protective link lines 600 can be disposed in the non-display area NDA, and for example, can be disposed in the first non-display area NDA1 in the non-display area NDA.

At least a portion of each protective link line 600 can extend in a lengthwise direction of the bending area BA in the bending area BA. For example, the lengthwise direction of the bending area BA can correspond to a second direction (e.g., a direction in which gate lines GL extends). For example, at least a portion of the protective link line 600 can extend in the second direction in the bending area BA.

Each of the one or more protective link lines 600 can be electrically connected to a corresponding one of the one or more signal lines 610 and run through the bending area BA.

Each signal line 610 can be electrically connected to a corresponding protective link line 600 in the first non-display area NDA1.

Each protective link line 600 can be connected in parallel with a corresponding signal line 610.

Each protective link line 600 can include a first end END1 and a second end END2. The first end END1 and second end END2 of each protective link line 600 can be electrically connected to first and second points of a corresponding signal line 610, respectively. For example, the second point can be a point different from the first point and located farther away from the pad area PA than the first point.

Each signal line 610 can include a first line part 611 electrically connected to the first end END1 of a corresponding protective link line 600 and extending to the pad area PA, a second line part 612 electrically connected to the second end END2 of the protective link line 600 and extending outside of the bending area BA, and a third line part 613 located between the first end END1 and the second end END2 of the protective link line 600, and electrically connected in parallel with the protective link line 600.

The third line part 613 can run through the bending area BA.

At least a portion of the third line part 613 can be disposed in the bending area BA.

At least a portion of the third line part 613 can be configured to extend in a first direction in the bending area BA.

Among the plurality of signal lines disposed in the first non-display area NDA1, two or more signal lines 610 located at an outermost edge can be connected in parallel with corresponding protective link lines 600, respectively.

Each protective link line 600 can include a horizontal sub-link line 600H extending in a second direction in the bending area BA and a vertical sub-link line 600V extending from the horizontal sub-link line 600H in the first direction. For example, the first direction can be a direction in which data lines DL extend, and the second direction can be a direction in which gate lines GL extend or a lengthwise direction of the bending area BA.

For example, the horizontal sub-link line 600H and the vertical sub-link line 600V can be formed as a single piece. The horizontal sub-link line 600H and the vertical sub-link line 600V can include a same metal. In another example, the horizontal sub-link line 600H and the vertical sub-link line 600V can be disposed in different metal layers and electrically connected to each other.

As described above, as one or more protective link lines 600 extend in the bending area BA in the lengthwise direction of the bending area BA, for example, in the second direction, the one or more protective link lines 600 can be prevented from cracking even when the bending area BA is bent.

In addition, at least a portion of the third line part 613 of the signal line 610 located in the bending area BA can be cracked when the bending area BA is bent. Even in this case, corresponding signals can be transferred normally through the one or more protective link lines 600 configured to cope fully with cracks.

For example, even when at least a portion of the third line part 613 of the signal line 610 is cracked, since the first line part 611 and the second line part 612 are electrically connected by the protective link line 600, a signal can be transferred normally from the first line part 611 to the second line part 612.

Signals transferred through one or more signal lines 610 can be signals related to display driving, for example, one or more control signals for gate driving, one or more clock signals for gate driving, one or more high level gate voltages, one or more low level gate voltages, various voltages needed to drive subpixels SP, and the like.

One or more control signals for gate driving, one or more clock signals for gate driving, one or more high level gate voltages, and one or more low level gate voltages can be transferred to one or more gate-in-panel circuits GIPC disposed in at least one of the second non-display area NDA2 and the fourth non-display area NDA4.

The various voltages needed to drive subpixels SP can be directly supplied to the display area DA through the bending area BA in the first non-display area NDA1. In this implementation, signal lines 610 configured to transfer the various voltages needed to drive subpixels SP can be configured to extend to the display area DA.

Referring to FIG. 6, for example, one or more signal lines 610 can be connected to one or more first pads PAD1 disposed in the first pad area PA1. In another example, one or more signal lines 610 can be connected to one or more second pads PAD2 disposed in the second pad area PA2. In another example, one or more signal lines 610 can be connected to both one or more first pads PAD1 disposed in the first pad area PA1 and one or more second pads PAD2 disposed in the second pad area PA2.

Referring to FIG. 7, each signal line 610 can further include a fourth line part 611*f* connected to the first end END1 of a corresponding protective link line 600 and extending to the second pad area PA2. The fourth line part 611*f* can be a line part extending from a point connected to the protective link line 600 to the second pad area PA2.

In one or more aspects, the display device 100 can further include a sensor-related line 700 disposed in the non-display area NDA and overlapping with at least one protective link line 600 in the bending area BA.

Since the sensor-related line 700 intersects and overlaps the at least one protective link line 600, the sensor-related line 700 can be needed to be disposed in a metal layer different from the at least one protective link line 600 in an area where the sensor-related line 700 intersects the at least one protective link line 600.

The sensor-related line 700 can include a main line part 700*m* not overlapping with the protective link line 600 and a jumping line part 700*j* overlapping with the protective link line 600.

For example, the main line part 700*m* can be disposed in the same metal layer as the protective link line 600. The jumping line part 700*j* can be disposed in a metal layer different from the protective link line 600.

The main line part 700*m* and the jumping line part 700*j* can be disposed in different metal layers and electrically connected to each other.

At least one protective link line 600 can be located closer to the first pad area PA1 among the first pad area PA1 and the second pad area PA2. Accordingly, the protective link line 600 can be located closer to the driving chip 510 disposed in the first pad area PA1 among the driving chip 510 disposed in the first pad area PA1 and the printed circuit 520 disposed in the second pad area PA2.

Figure 8:
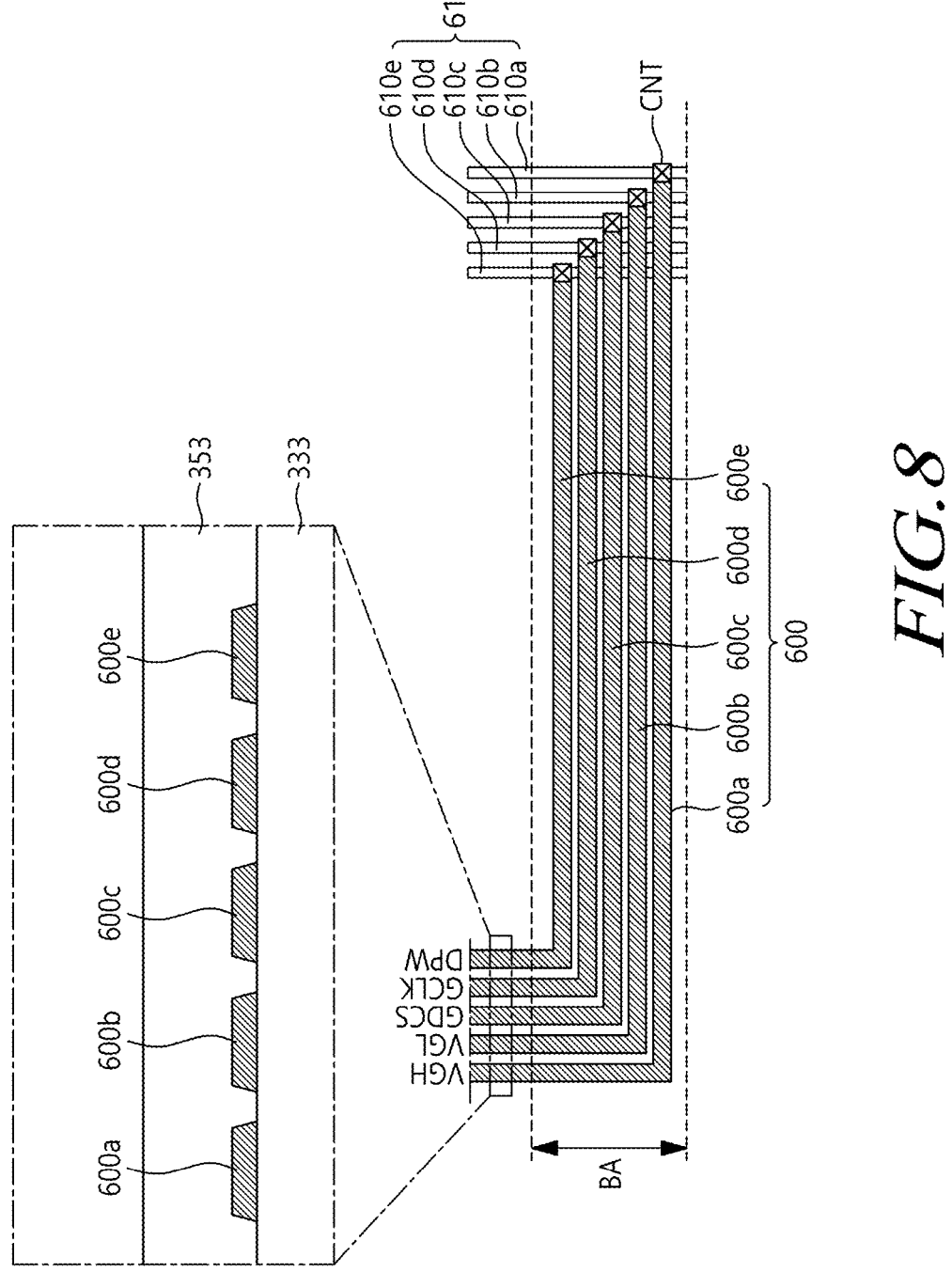
FIG. 8 illustrates a plurality of example signal lines and a plurality of example protective link lines disposed in the first non-display area of the display panel according to aspects of the present disclosure.

FIG. 8 illustrates a plurality of example signal lines 610 and a plurality of example protective link lines 600 disposed in the first non-display area NDA1 of the display panel 110 according to aspects of the present disclosure.

Referring to FIG. 8, when a plurality of signal lines 610 (610*a*, 610*b*, 610*c*, 610*d*, and 610*e*), which are crack-vulnerable lines, are disposed in the first non-display area NDA1, to enable signals to be normally transferred even when cracks occur in the plurality of signal lines 610 (610*a*, 610*b*, 610*c*, 610*d*, and 610*e*), a plurality of protective link lines 600 (600*a*, 600*b*, 600*c*, 600*d*, and 600*e*) can be connected to the plurality of signal lines 610 (610*a*, 610*b*, 610*c*, 610*d*, and 610*e*), respectively.

Each of the plurality of signal lines 610 (610*a*, 610*b*, 610*c*, 610*d*, and 610*e*) shown in FIG. 8 can be third line parts 613.

The plurality of signal lines 610 (610*a*, 610*b*, 610*c*, 610*d*, and 610*e*) and the plurality of protective link lines 600 (600*a*, 600*b*, 600*c*, 600*d*, and 600*e*) can be disposed in different metal layers. Accordingly, the plurality of signal lines 610 (610*a*, 610*b*, 610*c*, 610*d*, and 610*e*) and the plurality of protective link lines 600 (600*a*, 600*b*, 600*c*, 600*d*, and 600*e*) can be connected to each other through contact holes CNT.

For example, the protective link lines 600 can include a first protective link line 600*a* and a second protective link line 600*b*. The signal lines 610 can include a first signal line 610*a* electrically connected to the first protective link line 600*a* in the first non-display area NDA1, and a second signal line 610*b* electrically connected to the second protective link line 600*b* in the first non-display area NDA1.

The first protective link line 600*a* and the first signal line 610*a* can transfer a high level gate voltage VGH to the gate-in-panel circuit GIPC. The second protective link line 600*b* and the second signal line 610*b* can transfer a low level gate voltage VGL to the gate-in-panel circuit GIPC.

Due to a large voltage difference between the high level gate voltage VGH and the low level gate voltage VGL, cracks can more easily occur in at least one of the first signal line 610*a* and the second signal line 610*b*.

Therefore, as the first protective link line 600*a*, which can cope fully with cracks, is connected in parallel with the first signal line 610*a*, and the second protective link line 600*b*, which can cope fully with cracks, is connected in parallel with the second signal line 610*b*, the high level gate voltage VGH and the low level gate voltage VGL can be delivered normally even when there is a high probability that cracks will occur in the first signal line 610*a* and the second signal line 610*b*.

In another example, the protective link line 600 can include a third protective link line 600*c*, a fourth protective link line 600*d*, and a fifth protective link line 600*e*. The signal lines 610 can include a third signal line 610*c* electrically connected to the third protective link line 600*c* in the first non-display area NDA1, and a fourth signal line 610*d* electrically connected to the fourth protective link line 600*d* in the first non-display area NDA1, and a fifth signal line 610*e* electrically connected to the fifth protective link line 600*e* in the first non-display area NDA1.

The third protective link line 600*c* and the third signal line 610*c* can deliver agate driving control signal GDCS to the gate-in-panel circuit GIPC. The fourth protective link line 600*d* and the fourth signal line 610*d* can deliver a gate driving clock signal GCLK to the gate-in-panel circuit GIPC. The fifth protective link line 600*e* and the fifth signal line 610*e* can transfer a subpixel driving voltage DPW (e.g., a bias voltage, a voltage for resetting a pixel electrode PE, and the like) to subpixels SP in the display area DA.

A sensor protective layer 353, which is an organic layer disposed on sensor metals TSM and bridge metals BRG, can extend from the display area DA to the first non-display area NDA1 of the non-display area NDA, and be configured to cover the protective link lines 600 (600*a*, 600*b*, 600*c*, 600*d*, and 600*e*).

In the first non-display area NDA1 of the non-display area NDA, the protective link lines 600 (600*a*, 600*b*, 600*c*, 600*d*, and 600*e*) can be disposed on the bank 333.

Aline width of at least one protective link line 600 can be greater than aline width of at least one signal line 610.

As discussed above, the signal transfer structures capable of coping fully with cracks and the configuration of the signal transfer structure in a plan view have been described. Hereinafter, stack-up configurations of example signal transfer structures capable of coping fully with cracks are described with reference to FIGS. 9 to 14.

Figure 9:
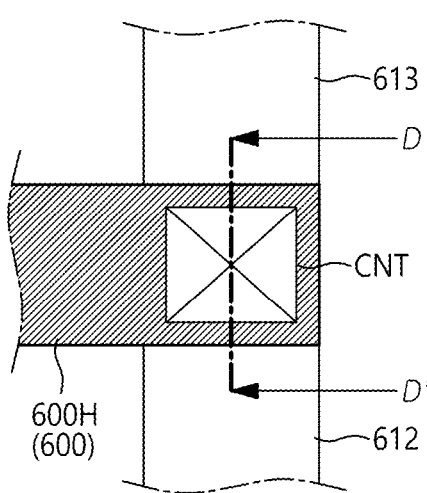
FIG. 9 is an example plan view of area A in FIG. 7.
Figure 10:
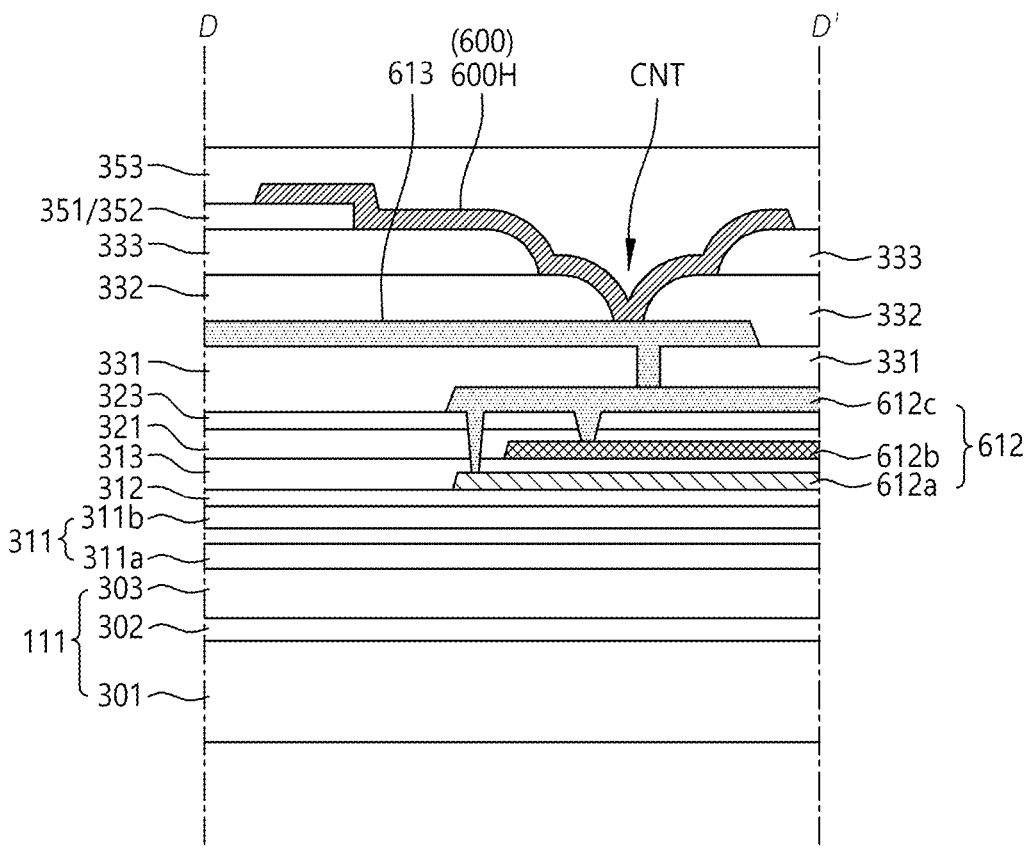
FIG. 10 is an example cross-sectional view taken along line D-D' of FIG. 9.
Figure 11:
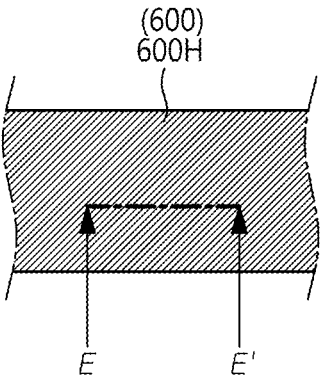
FIG. 11 is an example plan view of area B in FIG. 7.
Figure 12:
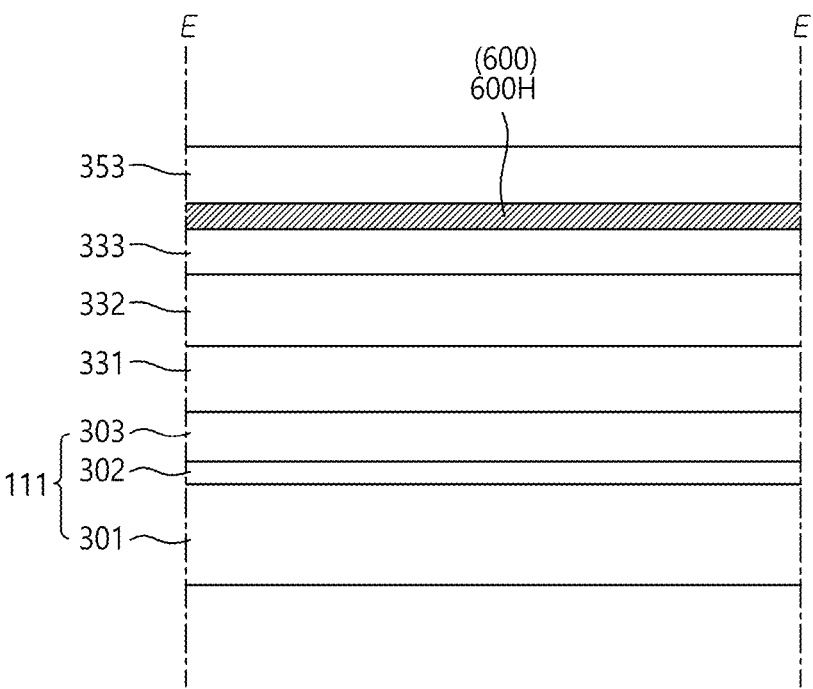
FIG. 12 is an example cross-sectional view taken along line E-E' of FIG. 11.
Figure 13:
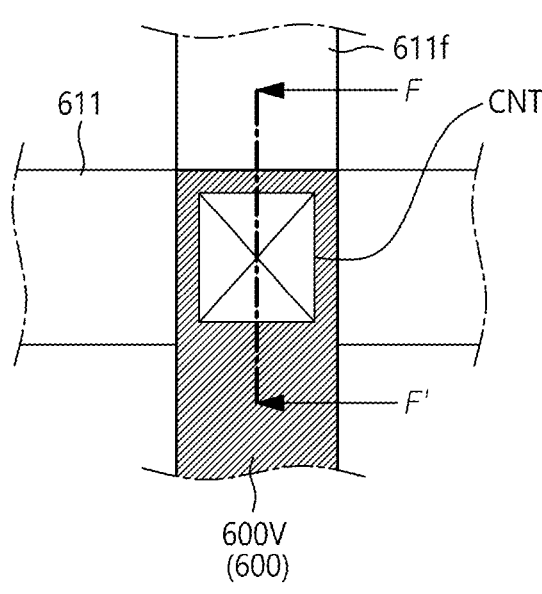
FIG. 13 is an example plan view of area C in FIG. 7.
Figure 14:
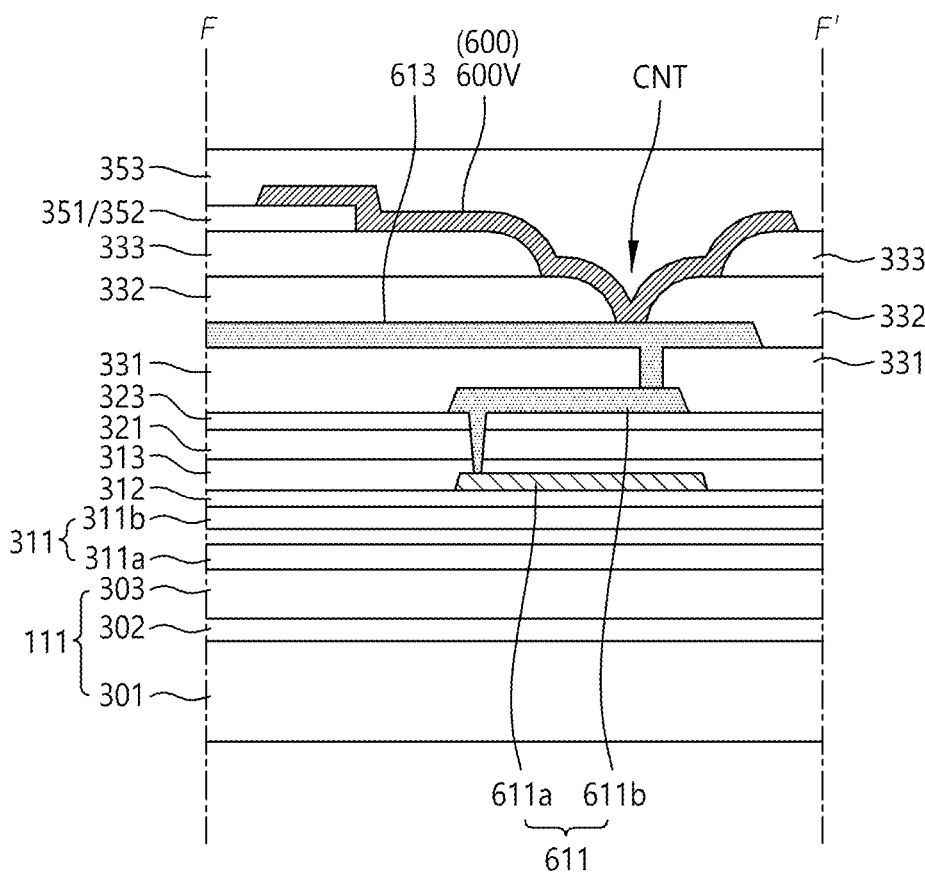
FIG. 14 is an example cross-sectional view taken along line F-F' of FIG. 13.

FIG. 9 is an example plan view of area A in FIG. 7. FIG. 10 is an example cross-sectional view taken along line D-D' of FIG. 9. FIG. 11 is an example plan view of area B in FIG. 7. FIG. 12 is an example cross-sectional view taken along line E-E' of FIG. 11. FIG. 13 is an example plan view of area C in FIG. 7. FIG. 14 is an example cross-sectional view taken along line F-F' of FIG. 13.

It should be noted that stack-up configurations in the cross-sectional views of FIGS. 10, 12, and 14 can correspond to the stack-up configuration in the cross-sectional view of FIG. 3. Thus, for convenience of description, discussions for layers related to these configurations are omitted, but when needed to discuss stack-up configurations of FIGS. 9 to 14, the stack-up configuration of FIG. 3 is referred mutatis mutandis.

As discussed above, the display device 100 according to example embodiments of the present disclosure can include transistors on the substrate 111, light emitting elements ED on the transistors, and the encapsulation layer 200 on the light emitting elements ED, and the touch sensor layer 210 disposed on the encapsulation layer 200. The touch sensor layer 210 can include one or more sensor metals TSM and one or more bridge metals BRG.

Referring to FIGS. 9 and 10, a horizontal sub-link line 600H of a protective link line 600 can be connected to a third line part 613 of a signal line 610 through a contact hole CNT. The horizontal sub-link line 600H of the protective link line 600 can extend in a second direction, which is the lengthwise direction of the bending area BA. Accordingly, the horizontal sub-link line 600H of the protective link line 600 can be prevented from cracking.

Referring to FIGS. 13 and 14, a vertical sub-link line 600V of the protective link line 600 can be connected to a first line part 611 of the signal line 610 through a contact hole CNT. The vertical sub-link line 600V of the protective link line 600 can extend in a first direction different from the second direction. At least a portion of the vertical sub-link line 600V of the protective link line 600 can be disposed outside of the bending area BA.

Referring to FIGS. 13 and 14, the vertical sub-link line 600V of the protective link line 600 can be connected to a fourth line part 611$f$ of the signal line 610 through the contact hole CNT.

Referring to FIGS. 10, 11, 12, and 14, the protective link line 600 including the horizontal sub-link line 600H and the vertical sub-link line 600V can be disposed in a sensor metal TSM and/or a bridge metal BRG. In one or more aspects, the protective link line 600 can include at least one of the sensor metal TSM and the bridge metal BRG.

The sensor protective layer 353 can extend from the display area DA to the first non-display area NDA1 and thereby, configured to cover the protective link line 600 and the horizontal sub-link line 600H and the vertical sub-link line 600V included in the protective link line 600.

Referring to FIG. 10, the horizontal sub-link line 600H of the protective link line 600 can be connected to the third line part 613 of the signal line 610 through a contact hole CNT through the bank 333 and the second planarization layer 332.

The third line part 613 of the signal line 610 can be disposed between the first planarization layer 331 and the second planarization layer 332. For example, the third line part 613 of the signal line 610 can be disposed in a second source-drain metal layer, which is a metal layer between the first planarization layer 331 and the second planarization layer 332.

A second line part 612 of the signal line 610 can include a first source-drain metal line part 612$c$ disposed between the second interlayer insulating layer 323 and the first planarization layer 331, a third metal line part 612$b$ disposed between the first interlayer insulating layer 313 and the second buffer layer 321, a first gate metal line part 612$a$ disposed between the first gate insulating layer 312 and the first interlayer insulating layer 313.

For example, the second line part 612 of the signal line 610 can include the first source-drain metal line part 612$c$ disposed in a first source-drain metal layer, the third metal line part 612$b$ disposed in a third metal layer, and the first gate metal line part 612$a$ disposed in a first gate metal layer.

The first source-drain metal line part 612$c$, the third metal line part 612$b$, and the first gate metal line part 612$a$ can be electrically connected to each other.

The third line part 613 of the signal line 610 can be connected to the first source-drain metal line part 612$c$ of the second line part 612 through a hole in the first planarization layer 331.

The first source-drain metal line part 612$c$ of the second line part 612 can be connected to the third metal line part 612$b$ of the second line part 612 through holes in the second interlayer insulating layer 323 and the second buffer layer 321. The first source-drain metal line part 612$c$ of the second line part 612 can be connected to the first gate metal line part 612$a$ of the second line part 612 through holes in the second interlayer insulating layer 323, the second buffer layer 321, and the first interlayer insulating layer 313.

Referring to FIG. 14, the vertical sub-link line 600V of the protective link line 600 can be connected to the fourth line part 611$f$ of the signal line 610 through a contact hole CNT through the bank 333 and the second planarization layer 332.

The fourth line part 611$f$ of the signal line 610 can be connected to the first line part 611 of the signal line 610. The first line part 611 can include the first source-drain metal line part 611$a$ and the third metal line part 611$b$.

The fourth line part 611$f$ of the signal line 610 can be connected to the third metal line part 611$b$ of the first line part 611 through a hole in the first planarization layer 331.

The third metal line part 611$b$ of the first line part 611 can be connected to the first source-drain metal line part 611$a$ of the first line part 611 through holes in the second interlayer insulating layer 323, the second buffer layer 321, and the first interlayer insulating layer 313.

Referring to FIGS. 10, 11, 12, and 14, the first gate metal layer can be a metal layer located between the first gate insulating layer 312 and the first interlayer insulating layer 313. The third metal layer can be a metal layer between the first interlayer insulating layer 313 and the second buffer layer 321. The first source-drain metal layer can be a metal layer between the second interlayer insulating layer 323 and the first planarization layer 331.

The second source-drain metal layer can be a metal layer between the first planarization layer 331 and the second planarization layer 332. The second source-drain metal layer can be a metal layer located higher from the substrate 111 than the first source-drain metal layer.

One or more sensor metals TSM and one or more bridge metals BRG can be metal layers located higher from the substrate 111 than the first source-drain metal layer.

Referring to FIG. 10, the third line part 613 of the signal line 610 can be disposed in the second source-drain metal layer, which is located closer to the substrate 111 than the sensor metals TSM and bridge metals BRG.

As shown in FIG. 3, in one or more aspects, the display panel 110 can include the relay electrode RE for electrically interconnecting the source electrode E2$b$ or drain electrode E2$c$ of the second transistor TFT2 and the pixel electrode PE of the light emitting element ED.

The source electrode E2*b* or drain electrode E2*c* of the second transistor TFT2 can be disposed in the first source-drain metal layer, which is a metal layer between the second interlayer insulating layer 323 and the first planarization layer 331. The relay electrode RE can be disposed in the second source-drain metal layer, which is a metal layer between the first planarization layer 331 and the second planarization layer 332.

Referring to FIGS. 10, 11, 12, and 14, the first line part 611, the second line part 612, and the third line part 613 can be disposed in a metal layer different from the protective link line 600.

In addition, at least one of the first line part 611, the second line part 612, and the third line part 613 can be disposed in a metal layer different from the remaining one or more thereof.

As discussed above, to provide the signal transfer structures according to example embodiments of the present disclosure, one or more corresponding signal lines 610 and one or more protective link lines 600 that are electrically connected in parallel with the one or more corresponding signal lines 610 and disposed in a direction to prevent cracks have been described.

Figure 15:
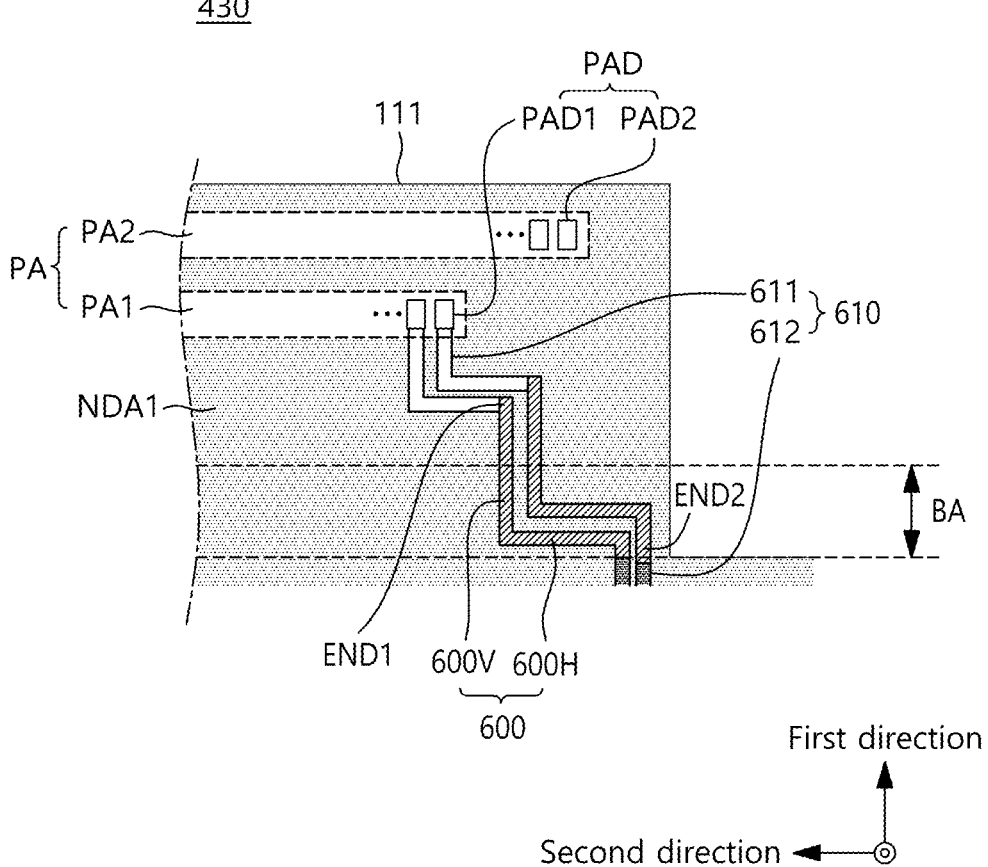
FIG. 15 is a plan view illustrating an example signal transfer structure disposed in a portion of the first non-display area of the display panel according to aspects of the present disclosure.
Figure 16:
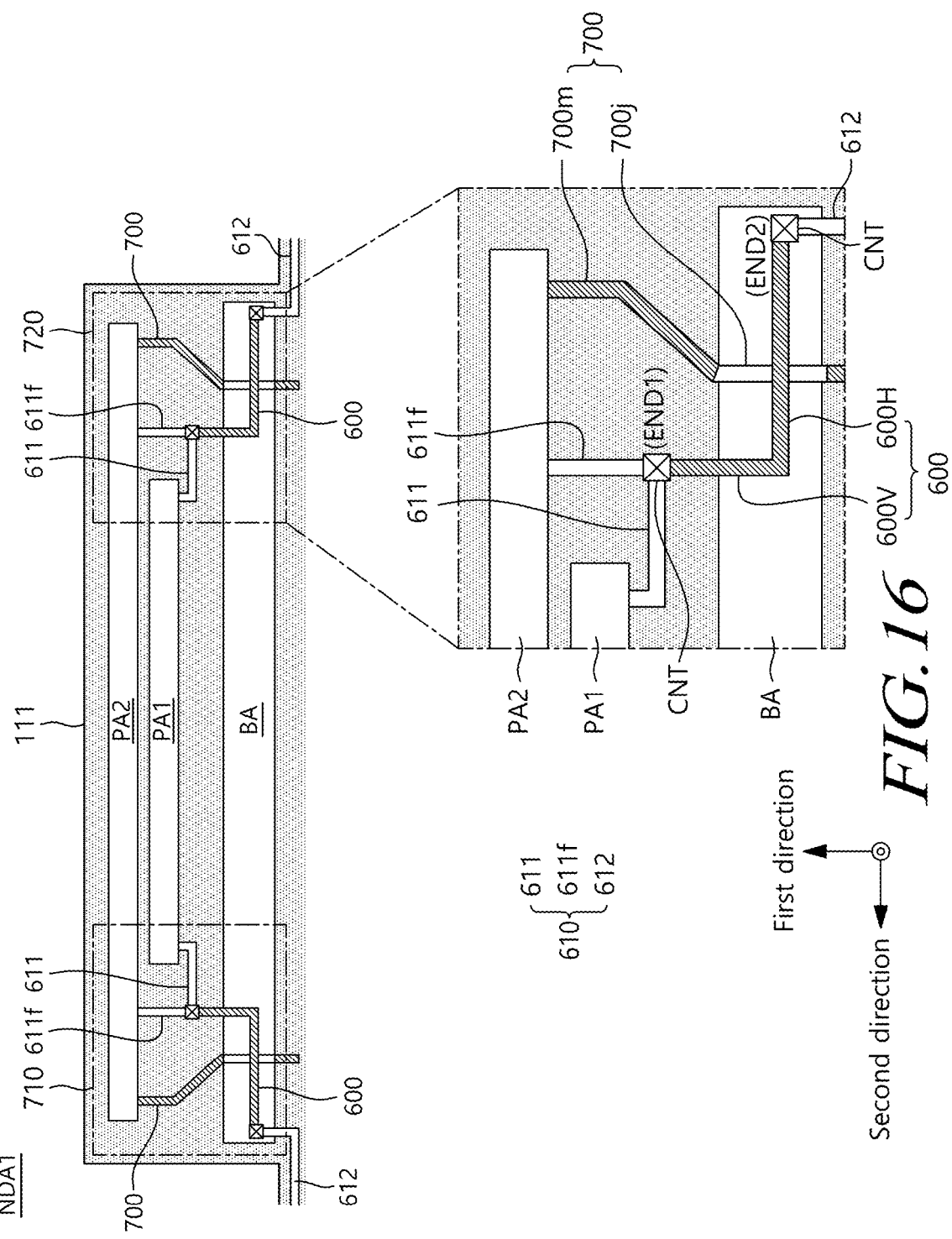
FIG. 16 is an example plan view of the first non-display area of the display panel according to aspects of the present disclosure.

FIG. 15 is a plan view illustrating an example signal transfer structure disposed in a portion of the first non-display area NDA1 of the display panel 110 according to aspects of the present disclosure. FIG. 16 is an example plan view of the first non-display area NDA1 of the display panel 110 according to aspects of the present disclosure. Hereinafter, for convenience of description, discussions on the same or substantially the same configurations as the configurations in the figures discussed above are omitted.

Referring to FIGS. 15 and 16, to provide signal transfer structures according to embodiments of the present disclosure, one or more protective link lines 600 can be connected to one or more corresponding signal lines 610 and be disposed in a direction to prevent cracks. Unlike one or more protective link lines 600 in FIGS. 7 to 14, one or more protective link lines 600 in FIGS. 15 and 16 may not be electrically connected in parallel with one or more corresponding signal lines 610.

Each signal line 610 can be electrically connected to a corresponding protective link line 600 in the first non-display area NDA1.

Each protective link line 600 can include a first end END1 and a second end END2.

Each signal line 610 can include a first line part 611 electrically connected to the first end END1 and extending to the first pad area PA1, and a second line part 612 electrically connected to the second end END2 and extending to outside of the bending area BA.

The first line part 611 and the second line part 612 can be spaced apart from each other, but be electrically connected by the protective link line 600.

The first line part 611 and the second line part 612 can be disposed outside of the bending area BA.

The first line part 611 and the second line part 612 can be disposed in a metal layer different from the protective link line 600. The first line part 611 and the second line part 612 can be disposed in the same metal layer or in different metal layers.

Referring to FIG. 16, each signal line 610 can further include a fourth line part 611*f* connected to the first end END1 of a corresponding protective link line 600 and extending to the second pad area PA2.

The signal transfer structures of FIGS. 15 and 16 can provide advantages of avoiding process defects in the second source-drain metal layer and reducing damage caused by etching layers located on and underneath the source-drain metal layer by removing the third line part 613 disposed in the second source-drain metal layer.

Figure 17:
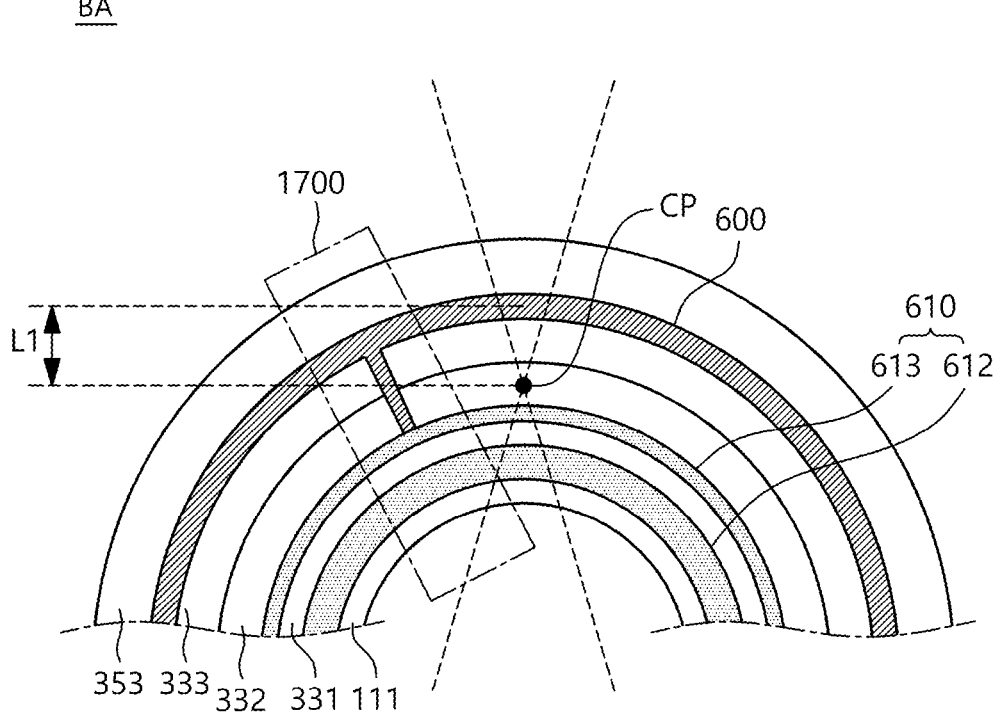
FIG. 17 is a cross-sectional view illustrating an example situation where a bending area is bent in the display panel according to aspects of the present disclosure.
Figure 18:
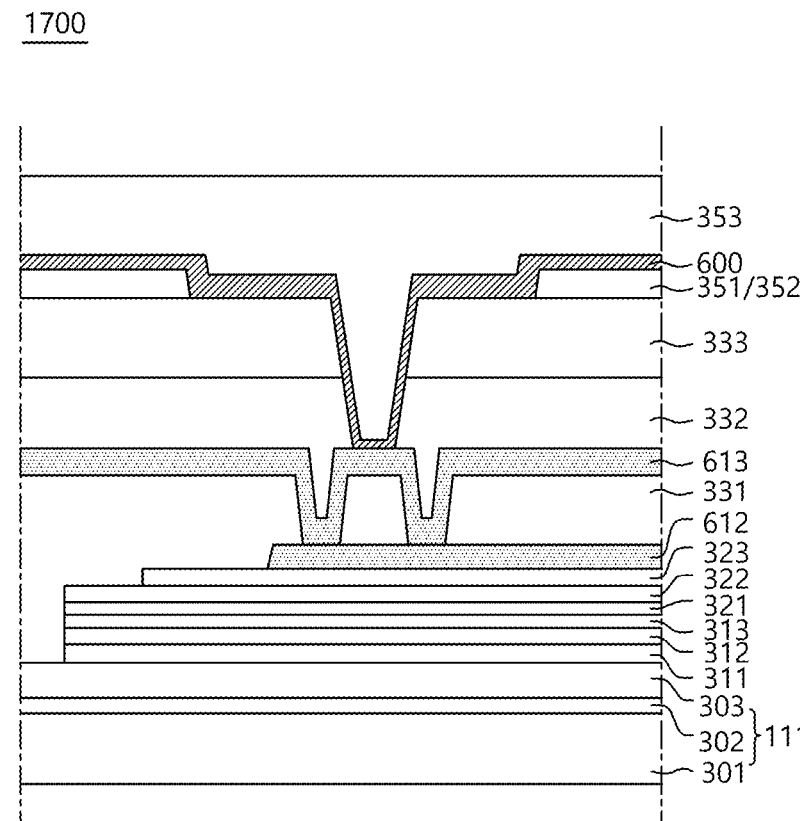
FIG. 18 is a cross-sectional view illustrating an example connection area where a protective link line and a signal line are connected in FIG. 17.

FIG. 17 is a cross-sectional view illustrating an example situation where the bending area BA is bent in the display panel 110 according to aspects of the present disclosure. FIG. 18 is a cross-sectional view illustrating an example connection area 1700 where a protective link line 600 and a signal line 610 are connected in FIG. 17.

Particularly, FIG. 17 is a cross-sectional view of the bending area BA of the display panel 110 when the signal transfer structures of FIGS. 6 and 7 are configured in the first non-display area NDA1. FIG. 18 is a cross-sectional view of the connection area 1700 in FIG. 17, which is an area where the protective link line 600 and the signal line 610 are connected.

Referring to FIGS. 17 and 18, when the signal transfer structures shown in FIGS. 6 and 7 are applied, a signal line 610 can include a second line part 612 and a third line part 613, and the third line part 613 can be disposed in the second source-drain metal layer, and the second line part 612 can be disposed in the first source-drain metal layer.

A protective link line 600 can be connected to the third line part 613 through holes in the bank 333 and the second planarization layer 332. The third line part 613 can be connected to the second line part 612 through a hole in the first planarization layer 331. In one or more aspects, the bank 333 can further include a spacer.

When the bending area BA of the display panel 110 is bent, the protective link line 600 disposed in a sensor metal TSM and/or a bridge metal BRG is bent, and thereby, tensile stress can be applied to the protective link line 600.

The smaller a first distance L1 between a point where the protective link line 600 is located and a bending center point CP, the less tensile stress applied to the protective link line 600 due to bending. Here, the bending center point CP can be a point where a degree of tension due to bending is the least or zero, and can be a point at which tensile stress is least applied or not applied.

In one or more aspects, the thickness of at least one of organic layers, such as the first planarization layer 331, the second planarization layer 332, the bank 333, and the sensor protective layer 353, can be adjusted to minimize tensile stress applied to the protective link line 600 when the protective link line 600 is bent.

For example, by increasing the thickness of the sensor protective layer 353, the protective link line 600 can be located closer to the bending center point CP. Accordingly, when the protective link line 600 is bent, the tensile stress applied to the protective link line 600 can be minimized.

In another example, by reducing the thickness of at least one of the first planarization layer 331, the second planarization layer 332, and the bank 333, the protective link line 600 can be located closer to the bending center point CP. Accordingly, when the protective link line 600 is bent, the tensile stress applied to the protective link line 600 can be minimized.

Figure 19:
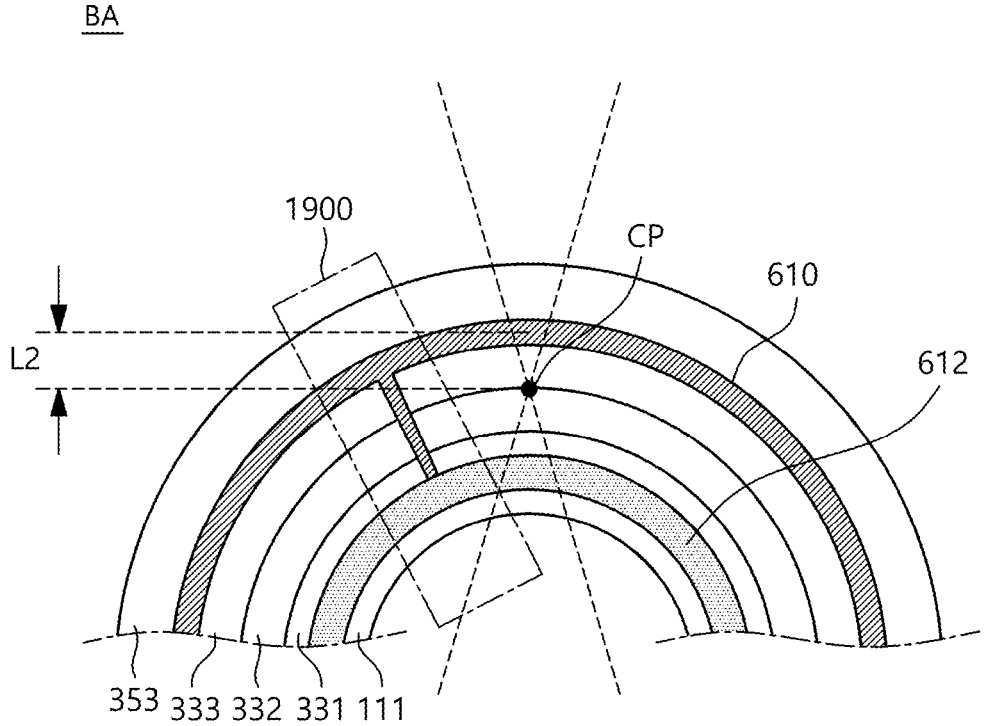
FIG. 19 is a cross-sectional view illustrating another example situation where the bending area is bent in the display panel according to aspects of the present disclosure.
Figure 20:
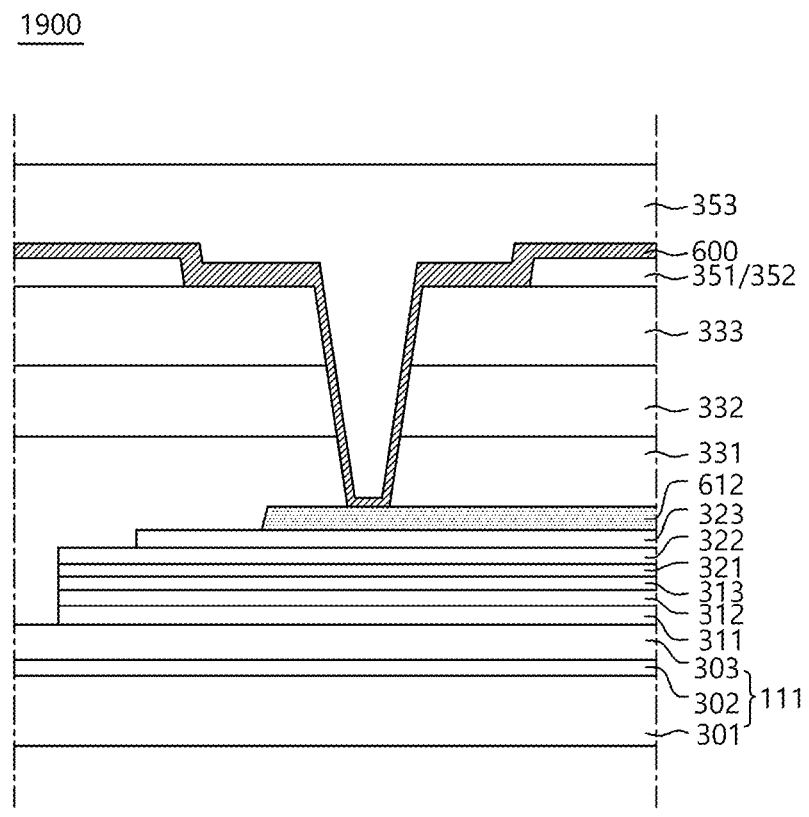
FIG. 20 is a cross-sectional view illustrating another example connection area where a protective link line and a signal line are connected in FIG. 19.

FIG. 19 is a cross-sectional view illustrating another example situation where the bending area BA is bent in the display panel 110 according to aspects of the present disclosure. FIG. 20 is a cross-sectional view illustrating another example connection area where a protective link line 600 and a signal line 610 are connected in FIG. 19.

Referring to FIGS. 19 and 20, when the signal transmission structures shown in FIGS. 15 and 16 are applied, a signal line 610 can include a second line part 612, and the second line part 612 can be disposed in the first source-drain metal layer.

A protective link line 600 can be connected to the second line part 612 through holes in the bank 333, the second planarization layer 332, and the first planarization layer 331. In one or more aspects, the bank 333 can further include a spacer.

When the bending area BA of the display panel 110 is bent, the protective link line 600 disposed in a sensor metal TSM and/or a bridge metal BRG is bent, and thereby, tensile stress can be applied to the protective link line 600.

The smaller a second distance L2 between a point where the protective link line 600 is located and a bending center point CP, the less tensile stress applied to the protective link line 600 due to bending. Here, the bending center point CP can be a point where a degree of tension due to bending is the least or zero, and can be a point at which tensile stress is least applied or not applied.

In one or more aspects, the thickness of at least one of organic layers, such as the first planarization layer 331, the second planarization layer 332, the bank 333, and the sensor protective layer 353, can be adjusted to minimize tensile stress applied to the protective link line 600 when the protective link line 600 is bent.

For example, by increasing the thickness of the sensor protective layer 353, the protective link line 600 can be located closer to the bending center point CP. Accordingly, when the protective link line 600 is bent, the tensile stress applied to the protective link line 600 can be minimized.

In another example, by reducing the thickness of at least one of the first planarization layer 331, the second planarization layer 332, and the bank 333, the protective link line 600 can be located closer to the bending center point CP. Accordingly, when the protective link line 600 is bent, the tensile stress applied to the protective link line 600 can be minimized.

In the stack-up configurations of FIGS. 19 and 20, since a third line part 613, which can be disposed in the second source-drain metal layer, is not disposed, the second distance L2 between a point where the protective link line 600 is located and the bending center point CP in FIGS. 19 and 20 can be slightly smaller than the first distance L1 between a point where the protective link line 600 is located and the bending center point CP in FIGS. 17 and 18. Accordingly, compared with the protective link line 600 in FIGS. 17 and 18, the protective link line 600 in FIGS. 19 and 20 can be located closer to the bending center point CP.

The example embodiments described above are briefly described as follows.

According to the example embodiments described herein, a display device can include a substrate including a display area for displaying an image, and a non-display area located outside of the display area and including a bending area and a pad area, a touch sensor layer disposed over the substrate, a signal line connected to a pad disposed in the pad area, including a metal different from the touch sensor layer, and delivering a display driving-related signal, and a protective link line electrically connected to the signal line and running through the bending area.

In one or more aspects, at least a portion of the protective link line can extend in the bending area in a lengthwise direction of the bending area.

In one or more aspects, the protective link line can include the same metal as the touch sensor layer.

In one or more aspects, the touch sensor layer can include at least one bridge metal and at least one sensor metal, and further include a sensor interlayer insulating layer disposed between the at least one bridge metal and the at least one sensor metal, and a sensor protective layer disposed on the at least one bridge metal and the at least one sensor metal.

In one or more aspects, the sensor protective layer can extend from the display area to the non-display area and be configured to cover the protective link line.

In one or more aspects, the non-display area can include a first non-display area located outside of the display area in a first direction, a second non-display area located outside of the display area in a second direction different from the first direction, a third non-display area located outside of the display area in a direction opposite to the first direction, and a fourth non-display area located outside of the display area in a direction opposite to the second direction.

In one or more aspects, the first non-display area can include the bending area and the pad area.

In one or more aspects, the protective link line can be disposed in the first non-display area.

In one or more aspects, at least a portion of the protective link line can extend in the second direction in the bending area.

In one or more aspects, the protective link line can include a first protective link line and a second protective link line. In one or more aspects, the signal line can further include a first signal line electrically connected to the first protective link line in the first non-display area, and a second signal line electrically connected to the second protective link line in the first non-display area.

In one or more aspects, the first protective link line and the first signal line can transfer a high level gate voltage as a display driving related signal, and the second protective link line and the second signal line can transfer a low level gate voltage as another display driving related signal.

In one or more aspects, the protective link line can include a horizontal sub-link line extending in the second direction in the bending area, and a vertical sub-link line extending from the horizontal sub-link line in the first direction.

In one or more aspects, a line width of the protective link line can be greater than a line width of the signal line.

In one or more aspects, the signal line can be electrically connected to the protective link line in the first non-display area, and the pad area can include a first pad area and a second pad area.

In one or more aspects, the protective link line can include a first end and a second end.

In one or more aspects, the signal line can include a first line part electrically connected to the first end and extending to the first pad area, a second line part electrically connected to the second end and extending outside of the bending area, and a third line part electrically connected in parallel with the protective link line between the first end and the second end.

In one or more aspects, at least a portion of the third line part can be configured to extend in the first direction in the bending area.

In one or more aspects, the third line part can be disposed in a metal layer (e.g., a second source-drain metal layer) located closer to the substrate than the touch sensor layer.

In one or more aspects, the display device can further include at least one transistor on the substrate, at least one light emitting element on the at least one transistor, an encapsulation layer on the at least one light emitting element, and a relay electrode configured to electrically interconnect a source electrode or a drain electrode of the at least one transistor and a pixel electrode of the at least one light emitting element.

In one or more aspects, the touch sensor layer can be disposed on the encapsulation layer. In one or more aspects, the source electrode or the drain electrode can be disposed in a first source-drain metal layer. In one or more aspects, the relay electrode can be disposed in a second source-drain metal layer. In one or more aspects, the third line part can be disposed in the second source-drain metal layer.

In one or more aspects, the first line part, the second line part, and the third line part can be disposed in a metal layer different from the protective link line. In one or more aspects, at least one of the first line part, the second line part, and the third line part can be disposed in a metal layer different from the remaining one or more thereof.

In one or more aspects, the signal line can be electrically connected to the protective link line in the first non-display area. In one or more aspects, the pad area can include a first pad area and a second pad area.

In one or more aspects, the protective link line can include a first end and a second end.

In one or more aspects, the signal line can include a first line part electrically connected to the first end and extending to the first pad area, and a second line part electrically connected to the second end and extending outside of the bending area.

In one or more aspects, the first line part and the second line part can be spaced apart from each other and be electrically connected by the protective link line.

In one or more aspects, the first line part and the second line part can be disposed outside of the bending area.

In one or more aspects, the first line part and the second line part can be disposed in a metal layer different from the protective link line.

In one or more aspects, the display device can further include a driving chip connected to a first pad area included in the pad area, and a printed circuit connected to a second pad area included in the pad area. In one or more aspects, the second pad area can be located farther away from the bending area than the first pad area.

In one or more aspects, the protective link line can be located closer to the driving chip among the driving chip and the printed circuit.

In one or more aspects, the signal line can further include a line part extending from a point connected to the protective link line to the second pad area.

In one or more aspects, the display device can further include a sensor-related line disposed in the non-display area and overlapping with the protective link line in the bending area.

In one or more aspects, the sensor-related line can include a main line part not overlapping with the protective link line, and a jumping line part overlapping with the protective link line. In one or more aspects, the main line part and the jumping line part can be disposed in different layers and be electrically connected to each other.

In one or more aspects, the main line part can be disposed in a same metal layer as the protective link line.

In one or more aspects, the jumping line part can be electrically connected to the main line part and disposed in a metal layer different from the protective link line.

According to the example embodiments of the present disclosure described herein, a display device can include a substrate including a display area for displaying an image, and a non-display area located outside of the display area and including a bending area and a pad area, a signal line connected to a pad disposed in the pad area, and a protective link line disposed in the non-display area and connected in parallel with the signal line.

In one or more aspects, at least a portion of the protective link line can extend in the bending area in a lengthwise direction of the bending area.

In one or more aspects, the display device can further include at least one transistor on a substrate, at least one light emitting element on the at least one transistor, an encapsulation layer on the at least one light emitting element, and a touch sensor layer disposed on the encapsulation layer.

In one or more aspects, the protective link line can include the same metal as the touch sensor layer.

According to the example embodiments of the present disclosure described herein, a display device can be provided that includes a substrate including a bending area, a signal line running through the bending area, and a protective link line connected in parallel with the signal line.

In one or more aspects, at least a portion of the protective link line can extend in the bending area in a lengthwise direction of the bending area.

In one or more aspects, the bending area can be included in the non-display area. In one or more aspects, the bending area can be included in the display area.

According to the one or more aspects described herein, a display device can be provided that has signal transfer structures capable of coping with bending cracks of signal lines.

According to the one or more aspects described herein, a display device can be provided that has signal transfer structures configured to enable signal transferring to be normally performed even when a bending crack occurs in a signal line that is bent along with a substrate.

A display device according to the one or more aspects of the present disclosure can provide advantages of not only preventing a situation in which a display panel has to be discarded due to failure to cope with bending cracks of signal lines, but also reducing burden on a process of detecting the bending cracks, and thereby, enabling process optimization to be realized.

The example embodiments of the present disclosure described above have been described for illustrative purposes; those skilled in the art will appreciate that various modifications, additions and substitutions are possible, without departing from the scope and spirit of the invention as disclosed in the accompanying claims. Although the example embodiments have been described for illustrative purposes, a person skilled in the art will appreciate that various modifications and applications are possible without departing from the essential characteristics of the present disclosure. For example, the specific components of the example embodiments can be variously modified.

What is claimed is:

1. A display device comprising:
a substrate comprising a display area configured to display an image, and a non-display area located outside of the display area and comprising a bending area and a pad area;
a touch sensor layer disposed on the substrate;
a signal line connected to a pad disposed in the pad area, comprising a metal different from the touch sensor layer, and configured to deliver a display driving-related signal; and
a protective link line having a first end and a second end, where the first end is electrically connected to the signal line outside the bending area, and the second end is electrically connected to the signal line inside the bending area, the protective link line comprising the same metal as the touch sensor layer, wherein a sensor protective layer of the touch sensor layer extends from the display area to the non-display area and is configured to cover the protective link line, and wherein the touch sensor layer comprises at least one bridge metal and at least one sensor metal, a sensor interlayer insulating layer disposed between the at least one bridge metal and the at least one sensor metal, and the sensor protective layer disposed on the at least one bridge metal and the at least one sensor metal.

2. The display device of claim 1, wherein at least a portion of the protective link line extends in a lengthwise direction of the bending area in the bending area, the lengthwise direction of the bending area corresponding to a row direction in which a plurality of gate lines for carrying gate signals are disposed.

3. The display device of claim 1, wherein the non-display area comprises:

a first non-display area located outside of the display area in a first direction;

a second non-display area located outside of the display area in a second direction different from the first direction;

a third non-display area located outside of the display area in a direction opposite to the first direction; and a fourth non-display area located outside of the display area in a direction opposite to the second direction, wherein the first non-display area comprises the bending area and the pad area, wherein the protective link line is disposed in the first non-display area, and wherein at least a portion of the protective link line extends in the second direction in the bending area.

4. The display device of claim 3, wherein the protective link line comprises a first protective link line and a second protective link line, wherein the signal line comprises a first signal line electrically connected to the first protective link line in the first non-display area, and a second signal line electrically connected to the second protective link line in the first non-display area, wherein the first protective link line and the first signal line transfer a high level gate voltage as the display driving-related signal, and wherein the second protective link line and the second signal line transfer a low level gate voltage as the display driving-related signal.

5. The display device of claim 3, wherein the protective link line comprises a horizontal sub-link line extending in the second direction in the bending area, and a vertical sub-link line extending from the horizontal sub-link line in the first direction, and wherein a line width of the protective link line is greater than a line width of the signal line.

6. The display device of claim 1, wherein the signal line is electrically connected to the protective link line in a first non-display area, wherein the pad area comprises a first pad area and a second pad area, and wherein the signal line comprises:

a first line part electrically connected to the first end and extending to the first pad area;

a second line part electrically connected to the second end and extending outside the bending area; and a third line part electrically connected in parallel with the protective link line between the first end and the second end.

7. The display device of claim 6, wherein at least a portion of the third line part is configured to extend in a first direction in the bending area.

8. The display device of claim 6, wherein the third line part is disposed in a metal layer located closer to the substrate than the touch sensor layer.

9. The display device of claim 6, further comprising:

at least one transistor on the substrate;

at least one light emitting element on the at least one transistor;

an encapsulation layer on the at least one light emitting element; and a relay electrode configured to electrically interconnect a source electrode or a drain electrode of the at least one transistor and a pixel electrode of the at least one light emitting element, wherein the touch sensor layer is disposed on the encapsulation layer, the source electrode or the drain electrode is disposed in a first source-drain metal layer, and the relay electrode is disposed in a second source-drain metal layer, and wherein the third line part is disposed in the second source-drain metal layer.

10. The display device of claim 6, wherein the first line part, the second line part, and the third line part are disposed in a metal layer different from the protective link line, and wherein at least one of the first line part, the second line part, and the third line part is disposed in a metal layer different from a remaining one or more of the first line part, the second line part and the third line part.

11. The display device of claim 1, wherein the signal line is electrically connected to the protective link line in a first non-display area, wherein the pad area comprises a first pad area and a second pad area, wherein the signal line comprises a first line part electrically connected to the first end and extending to the first pad area, and a second line part electrically connected to the second end and extending outside the bending area, and wherein a portion of the protective link line extends from inside the bending area toward outside the bending area along a column direction in which a plurality of data lines for carrying data signals are disposed.

12. The display device of claim 11, wherein the first line part and the second line part are disposed outside of the bending area.

13. The display device of claim 11, wherein the first line part and the second line part are disposed in a metal layer different from the protective link line.

14. The display device of claim 1, further comprising:

a driving chip connected to a first pad area included in the pad area; and a printed circuit connected to a second pad area included in the pad area, wherein the protective link line is located closer to the driving chip among the driving chip and the printed circuit.

15. The display device of claim 14, wherein the signal line further comprises a line part extending between two points, which are connected respectively to the first end and the second end of the protective link line.

16. The display device of claim 1, further comprising a sensor-related line disposed in the non-display area and overlapping with the protective link line in the bending area, wherein the sensor-related line comprises a main line part not overlapping with the protective link line, and a jumping line part electrically connected to the main line part and overlapping with the protective link line, and wherein the main line part is disposed in a same metal layer as the protective link line, and the jumping line part is disposed in a metal layer different from the protective link line.

17. A display device comprising:

a substrate comprising a display area configured to display an image, and a non-display area located outside of the display area and comprising a bending area and a pad area;

at least one transistor on the substrate;

at least one light emitting element on the at least one transistor;

an encapsulation layer on the at least one light emitting element;

a touch sensor layer on the encapsulation layer;

a signal line connected to a pad disposed in the pad area; and a protective link line disposed in the non-display area and connected in parallel with the signal line, wherein the protective link line has a first end and a second end, where the first end is electrically connected to the signal line outside the bending area, and the second end is electrically connected to the signal line inside the bending area, wherein at least a portion of the protective link line extends in the bending area in a lengthwise direction of the bending area, the lengthwise direction of the bending area corresponding to a row direction in which a plurality of gate lines for carrying gate signals are disposed, wherein a sensor protective layer of the touch sensor layer extends from the display area to the non-display area and is configured to cover the protective link line, and wherein the touch sensor layer comprises at least one bridge metal and at least one sensor metal, a sensor interlayer insulating layer disposed between the at least one bridge metal and the at least one sensor metal, and the sensor protective layer disposed on the at least one bridge metal and the at least one sensor metal.

18. The display device of claim 17, wherein the protective link line comprises a same metal as the touch sensor layer.

19. A display device comprising:

a substrate comprising a bending area;

a signal line running through the bending area; and a protective link line connected in parallel with the signal line, wherein the protective link line has a first end and a second end, where the first end is electrically connected to the signal line outside the bending area, and the second end is electrically connected to the signal line inside the bending area, wherein at least a portion of the protective link line extends in a lengthwise direction of the bending area in the bending area, the lengthwise direction of the bending area corresponding to a row direction in which a plurality of gate lines for carrying gate signals are disposed, wherein a sensor protective layer of a touch sensor layer on the substrate extends from a display area to a non-display area and is configured to cover the protective link line, and wherein the touch sensor layer comprises at least one bridge metal and at least one sensor metal, a sensor interlayer insulating layer disposed between the at least one bridge metal and the at least one sensor metal, and the sensor protective layer disposed on the at least one bridge metal and the at least one sensor metal.

\* \* \* \* \*